United States Patent [19]
Fujimoto et al.

[11] Patent Number: 5,893,057
[45] Date of Patent: Apr. 6, 1999

[54] VOICE-BASED VERIFICATION AND IDENTIFICATION METHODS AND SYSTEMS

[75] Inventors: Jun-ichiroh Fujimoto, Yokohama; Tatsuo Miyachi, Tokyo; Atsushi Shibata, Sagamihara, all of Japan

[73] Assignee: Ricoh Company Ltd., Japan

[21] Appl. No.: 733,394

[22] Filed: Oct. 18, 1996

[30] Foreign Application Priority Data

| Oct. 24, 1995 | [JP] | Japan | 7-298927 |
| Oct. 30, 1995 | [JP] | Japan | 7-306821 |
| Oct. 30, 1995 | [JP] | Japan | 7-306833 |
| Oct. 31, 1995 | [JP] | Japan | 7-306556 |
| Oct. 31, 1995 | [JP] | Japan | 7-306679 |

[51] Int. Cl.[6] .................................. G10C 9/06
[52] U.S. Cl. ...................... 704/246; 704/246; 704/275
[58] Field of Search .................... 704/246, 275

[56] References Cited

U.S. PATENT DOCUMENTS

| 5,297,194 | 3/1994 | Hunt | 379/88 |
| 5,303,299 | 4/1994 | Hunt | 379/88 |
| 5,465,290 | 11/1995 | Hampton | 379/67 |
| 5,499,288 | 3/1996 | Hunt | 379/88 |
| 5,652,903 | 7/1997 | Weng | 395/800 |

FOREIGN PATENT DOCUMENTS

| 57-104193 | 6/1982 | Japan . |
| 1-302297 | 12/1989 | Japan . |

OTHER PUBLICATIONS

Article entitled "Digital Voice Processing" (in Japanese) by Sadaoki Furui (1985).

*Primary Examiner*—David R. Hudspeth
*Assistant Examiner*—Daniel Abebe
*Attorney, Agent, or Firm*—Knoble & Yoshida LLC

[57] ABSTRACT

The speaker recognition methods and systems of the current invention involves at least two processing units for performing the speaker recognition based upon his or her voice input. To perform the speaker recognition efficiently as well as securely, the voice input is initially processed at the input site so that intermediate voice characteristic information is extracted. The intermediate voice characteristic information is transmitted to a second location for the final determination for identifying or verifying a speaker.

38 Claims, 29 Drawing Sheets

FIG. 10

| SPEAKER IDENTIFICATION | STANDARD VOICE CHARACTERISTIC INFORMATION | SECONDARY INFORMATION | |
|---|---|---|---|
| | | UPDATE | THRESHOLD VALUE |
| A's I.D. | A's STANDARD PATTERN | | $TH_A$ |
| B's I.D. | B's STANDARD PATTERN | | $TH_B$ |
| C's I.D. | C's STANDARD PATTERN | | $TH_C$ |
| D's I.D | D's STANDARD PATTERN | | $TH_D$ |
| --- | --- | | --- |

| USER IDENTIFICATION | SECONDARY INFORMATION | |
|---|---|---|
| | METHOD OF CONFIRMATION | ASSOCIATED INFORMATION |
| A's I.D. | x x x x | TH$_A$ |
| B's I.D. | x x x x | TH$_B$ |
| C's I.D. | x x x x | TH$_C$ |
| D's I.D | x x x x | TH$_D$ |
| --- | --- | --- |

VOICE-BASED VERIFICATION AND IDENTIFICATION METHODS AND SYSTEMS

FIELD OF THE INVENTION

The current invention is generally related to methods and systems for recognizing a speaker based upon a voice input, and more particularly related to methods and systems for efficiently transmitting intermediate voice characteristic information from one location to another for the purpose of identifying or verifying a speaker.

BACKGROUND OF THE INVENTION

The speaker recognition has certain advantages over other forms of identification or verification. The speaker recognition is a general term for voice identification and voice verification. The voice identification identifies a particular individual from a group of individuals based upon a voice input. The voice verification verifies that a voice input belongs to a particular individual. In either process, generally, an individual initially registers his or her voice by uttering words such as his or her name. To later identify or verify the individual, the individual utters the same or other words. The voice input is compared to the registered voice to determine a match. Since speaker recognition generally does not require a speaker to memorize any code such a personal identification number (PIN), the speaker recognition process is user-friendly. Furthermore, the identification information is more susceptible to theft and fraud. For example, a criminal learns a PIN for telephone calls by looking over the shoulder of a bona-fide user. Similarly, a wrong doer can steal the PIN for automatic teller machines for banking. To substantially reduce theft and fraud, the above described user friendly speaker recognition process is advantageous over the conventional PIN-based identification process.

Despite the above described advantages, the speaker recognition faces a number of difficulties in implementing a reliable system. The difficulties generally originate from the nature of the voice data. The voice data requires a large amount of memory. Furthermore, the voice input is susceptible to changes over time, due to input devices or under certain physical conditions. Human voice is not constant over a long period of time. Human voice is also affected by a speaker's physical condition such as a cold. Lastly, during the digital conversion, input devices such as a microphone and an analog-to-digital converter affect the digital voice data.

To overcome these problem, a series of voice parameters is extracted as intermediate voice characteristic information from the digitally converted voice input data, and then final voice characteristic information such as a voice characteristic pattern is generated from the extracted voice parameter values. The voice parameters include a spectrum, a cepstrum and a LPC (linear prediction coefficient). Briefly, the spectrum is obtain a Formant frequency of the voice tract based upon frequency transformed voice data. The cepstrum is a result of Fourier transform or inverse Fourier transform, and the Formant frequency reflects both the vocal tract and the vocal chord. A LPC is a coefficient obtained using the linear prediction method based upon the assumption that the vocal tract does not generate any antiresonance. Regardless of the above described parameters, five to fifteen voice parameters are determined for each time period, and the time period generally ranges from 10 to 20 millisecond. Based upon the above described voice parameters, the voice characteristic pattern is generated as final voice characteristic information to save the storage space as well as to improve the reliability of the speaker recognition process. For more detailed description of these voice parameters, "Digital Voice Processing" (in Japanese) by Sadaoki Furui (1985) is incorporated herein by external reference.

In using the above described voice recognition process in the computer or telephone network, additional concerns need to be addressed. The computer network generally includes a large number of independent processing units such as personal computers. In a commercial application, the voice recognition provider must be able to communicate to these independent processing units at remote sites. For example, in a banking transaction system, a central computer must be able to communicate to automatic teller machines and identify or verify a user based upon a voice input in a reliable and speedy manner. However, none of the relevant prior art is directed to the network application of the speaker recognition. Prior art references such as Japanese Patent 1-302297 is directed to a certain security feature of speaker recognition while Japanese Patent 57-104193 is directed to updating the previously registered voice data.

The current invention is thus directed to the method and system for recognizing a speaker based upon a voice input over a network in a reliable and efficient manner.

SUMMARY OF THE INVENTION

To solve the above and other problems, according to one aspect of the current invention, a method of speaker recognition, includes the steps of:

a) storing predetermined first final voice characteristic information at a first site; b) inputting voice data at a second site; c) processing the voice data at the second site to generate intermediate voice characteristic information; d) transmitting the intermediate voice characteristic information from the second site to the first site; e) further processing at the first site the intermediate voice characteristic information transmitted from the second site for generating second final voice characteristic information; and f) determining at the first site whether the second final voice characteristic information is substantially matching the first final voice characteristic information and generating a determination signal indicative of the determination.

According to a second aspect of the current invention, a method of speaker recognition, includes the steps of: a) storing a plurality of pairs of first final voice characteristic information and corresponding identification information at a first site; b) inputting voice data and one of the identification information at a second site; c) transmitting the one identification information to the first site; d) transmitting to the second site one of the first final voice characteristic information which corresponds to the one identification information as well as a determination factor; e) processing the voice data at the second site to generate second final voice characteristic information; and f) determining at the second site whether the second final voice characteristic information is substantially matching the first final voice characteristic information based upon the determination factor and generating a determination signal indicative of the determination.

According to a third aspect of the current invention, a speaker recognition system, includes: a registration unit for processing voice data to generate standard voice characteristic information according the voice data and storing the standard voice characteristic information therein; a first processing unit for inputting test voice data and for processing the test voice data to generate intermediate test voice characteristic information; and; a second processing unit communicatively connected to the first processing unit for receiving the intermediate test voice characteristic information and for further processing the intermediate test voice characteristic information to generate test voice characteristic information, the processing unit connected to the registration processing unit for determining if the test voice characteristic information substantially matches the standard voice characteristic information.

According to a fourth aspect of the current invention, a speaker recognition system, includes: a first processing unit for processing voice data to generate standard voice characteristic information according the voice data and storing the standard voice characteristic information with an associated id information; a second processing unit operationally connected to the first processing unit for inputting the associated id information and test voice data, the second processing unit transmitting to the first processing unit the associated id information, the second processing unit retrieving the standard voice characteristic information, the second processing unit generating a test voice characteristic information based upon the test voice data and determining that the standard voice characteristic information substantially matches the test voice characteristic information.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 10 is an example of a table format for storing information including threshold values for the speaker recognition process.

FIG. 26 is an example of a table format for storing information for the security unit in the speaker recognition process.

DETAILED DESCRIPTION OF THE PREFERRED EMBODIMENT(S)

Figure 1:
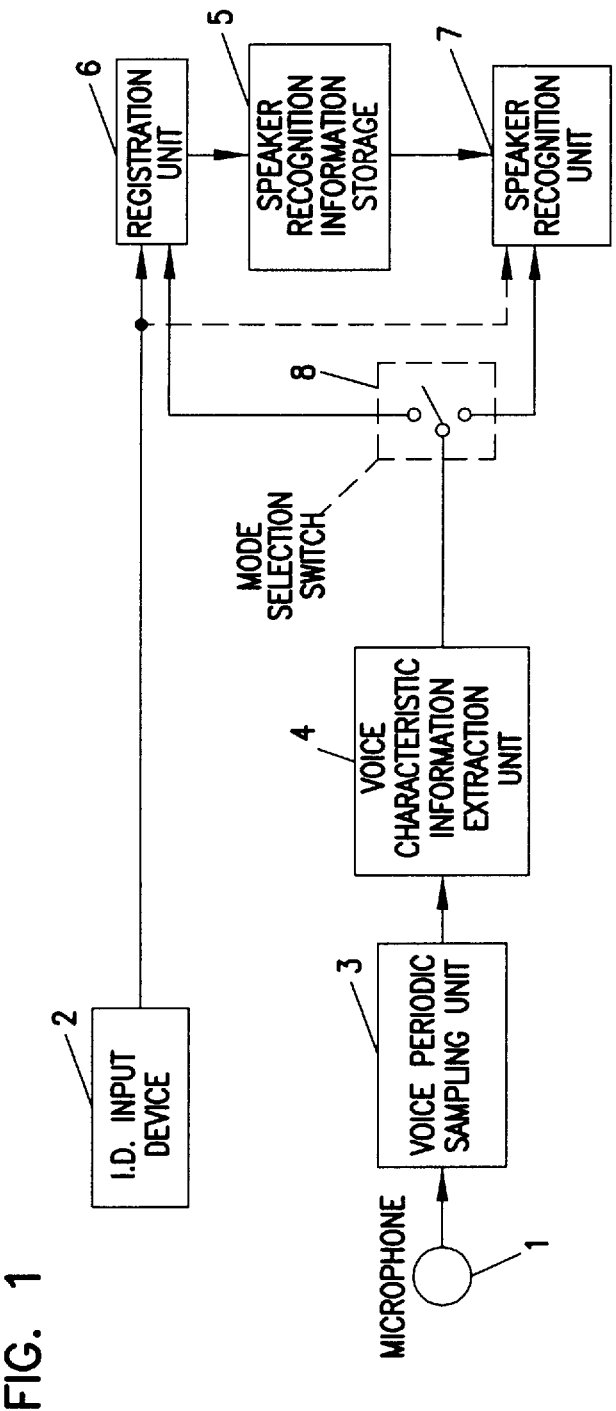
FIG. 1 illustrates some critical components of a speaker recognition process.

Referring now to the drawings, wherein like reference numerals designate corresponding structure throughout the views, and referring in particular to FIG. 1, to describe the basic components of the speaker recognition, a user speaks to a microphone 1 to input his or her voice. A voice periodic sampling unit 3 samples voice input data at a predetermined frequency, and a voice characteristic information extraction unit 4 extracts predetermined voice characteristic information or a final voice characteristic pattern for each sampled voice data set. When the above input and extraction processes are performed for a registration or initiation process, a mode selection switch 8 is closed to connect a registration unit 6 so that the voice characteristic information is stored as standard voice characteristic information of the speaker in a speaker recognition information storage unit 5 along with speaker identification information.

Figure 2:
FIG. 2 is an example of a table format for storing information for the speaker recognition process.

Referring now to FIG. 2, an example of the stored information in the speaker recognition information storage unit 5 is illustrated. Speaker identification information includes a speaker's name, an identification number, the date of birth, a social security number and so on. In the stored information, corresponding to each of the above speaker identification information is the standard voice characteristic information of the speaker. As described above, the standard voice characteristic information is generated by the voice processing units 3 and 4 which extracts the voice characteristics pattern from the predetermined voice data inputted by the speaker during the registration process. The final voice characteristic information or the voice characteristic pattern includes a series of the above described voice parameters.

Referring back to FIG. 1, when the mode selection switch is closed to connect a speaker recognition unit 7, a speaker recognition process is performed. To be recognized as a registered speaker, a user first inputs his or her speaker identification information such as a number via an identification input device 2. Based upon the identification information, the registration unit 6 specifies the corresponding standard voice characteristic information or a final voice characteristic pattern stored in the speaker recognition information storage unit 5 and transmits it to a speaker recognition unit 7. The user also inputs his or her voice data by uttering a predetermined word or words through the microphone 1. The inputted voice data is processed by the voice periodic sampling unit 3 and the voice characteristic parameter extraction unit 4 to generate test voice characteristic information. The speaker recognition unit 7 compares the test voice characteristic information against the above specified standard voice characteristic information to determine if they substantially match. Based upon the above comparison, the speaker recognition unit 7 generates a determination signal indicative the above substantial matching status.

The above described and other elements of the speaker recognition concept are implemented for a computer or telephone networks according to the current invention. The computer-network based speaker recognition systems are assumed to have a large number of local processing units and at least one administrative processing unit. The network is also assumed to share a common data base which is typically located at a central administrative processing unit. In general, the computer-network based speaker recognition systems have two ends of a spectrum. One end of the spectrum is characterized by heavy local-processing of the voice input while the other end of the spectrum is marked by heavy central-processing of the voice input. In other words, to accomplish the speaker recognition, the voice input is processed primarily by the local-processing unit, the central-processing unit or a combination of both to determine whether it substantially matches a specified previously registered voice data. However, the computer networks used in the current invention is not necessarily limited to the above described central-to-terminal limitations and include other systems such as distributed systems.

Figure 3:
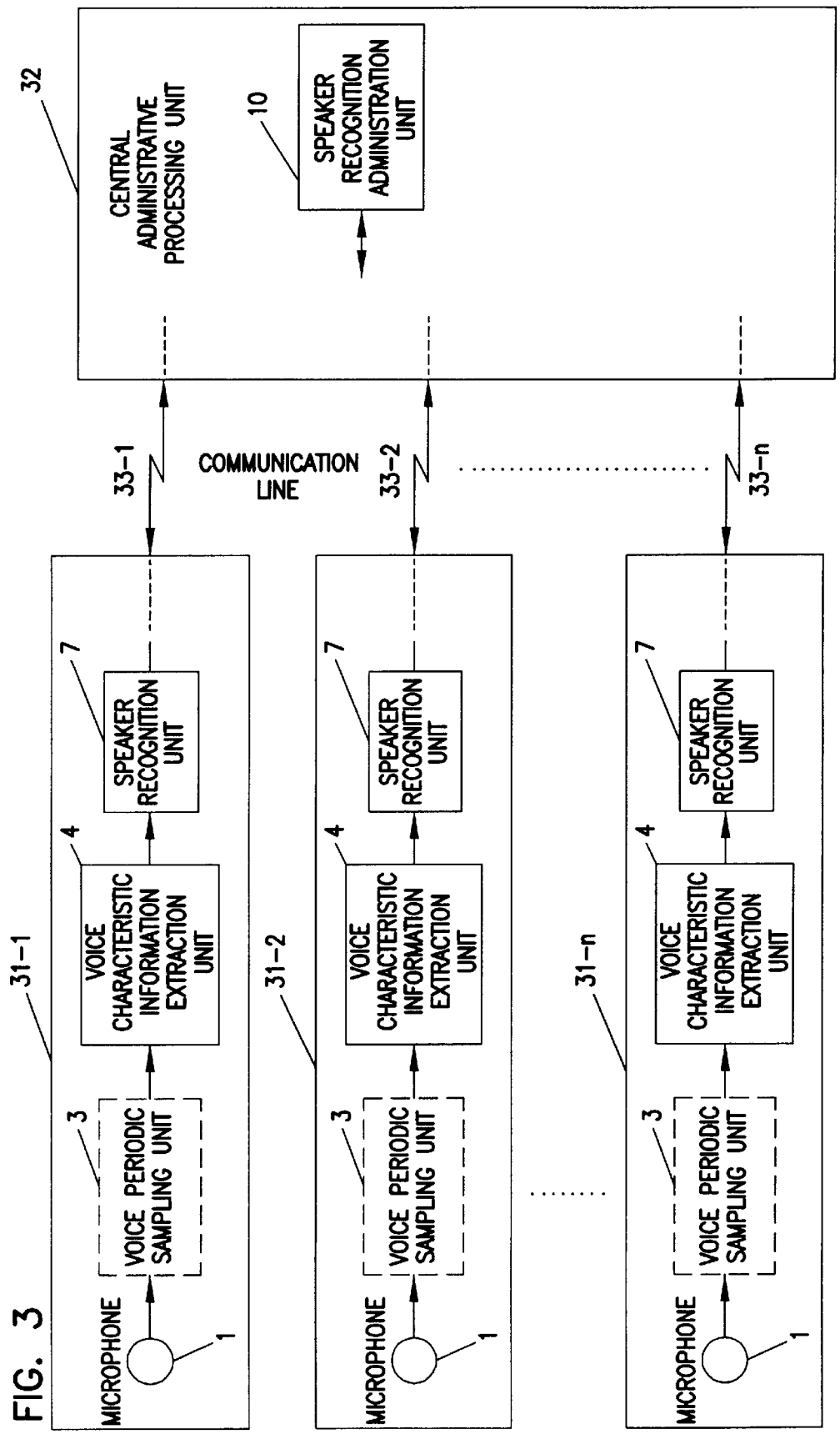
FIG. 3 diagrammatically illustrates a first preferred embodiment of the speaker recognition system according to the current invention.

Now referring to FIG. 3, one preferred embodiment of the speaker recognition system is illustrated according to the current invention. Local-processing units 31-1 through 31-n are respectively connected to an administrative central processing unit 32 by network lines 33-1 through 33-n. The local-processing units 31-1 through 31-n each contain a microphone 1, a voice periodic sampling unit 3, a voice characteristic parameter extraction unit 4, and a speaker recognition unit 7. Each of the local-processing units 31-1 through 31-n is capable of inputting voice data and processing the voice input to determine whether or its characteristic pattern substantially matches a corresponding standard voice characteristic pattern. The administrative central processing unit 32 includes a speaker recognition data administration unit 10 for performing the administrative functions which include the registration and updating of the standard voice characteristic information.

Figure 4:
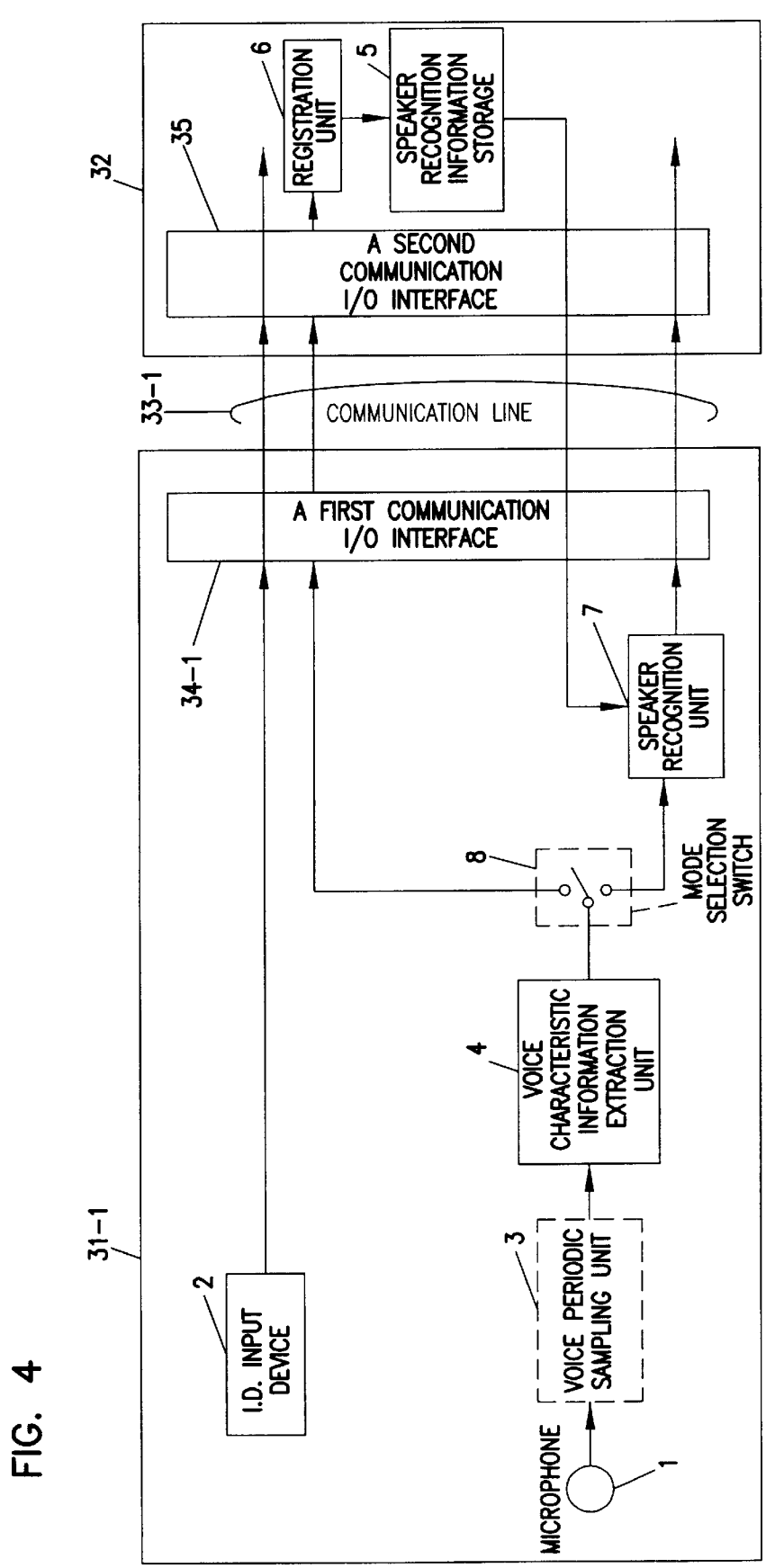
FIG. 4 is a detail illustration of a part of the first preferred embodiment as shown in FIG. 3.

Now referring to FIG. 4, the above described preferred embodiment of the speaker recognition system is further described in details. For the sake of simplicity, only one local processing unit 31-1 is further illustrated additional components. For the local processing unit 31-1 to communicate with the administrative processing unit 32 through the communication line 33-1, the local processing unit 34-1 provides a first communication input/output (I/O) interface unit 34-1. Similarly, the administrative processing unit 32 contains a second communication I/O interface unit 35 at the other end of the communication line 33-1. In the following, the registration and the recognition processes are generally described using the above described preferred embodiment.

To register standard voice characteristic information, the user inputs voice data by uttering a predetermined set of words through the microphone 1 and a user identification number through the ID input device 2. The mode switch 8 is placed in a registration mode for transmitting the processed voice characteristic information to the registration unit 6 via the interfaces 34-1, 35 and the communication line 33-1. The registration unit 6 controls the speaker recognition information storage unit 5 for storing the voice characteristic information along with the speaker identification number.

To later perform the speaker recognition process, a user specifies his or her user ID information via the user ID input device 2. The input information is transmitted to the administrative processing unit 32 through the interfaces 34-1, 35 and the communication line 33-1. In response, the administrative processing unit 32 sends to the speaker recognition unit 7 the standard voice characteristic information corresponding to the specified user ID. The selection mode switch is set to the speaker recognition mode to connect the speaker recognition unit 7. The user also inputs his or her voice input through the microphone 1, and the periodic sampling unit 3 and the voice characteristic information extraction unit 4 process the voice input for generating the test voice characteristic information and outputting to the speaker recognition unit 7. Finally, the speaker recognition unit 7 determines as to whether the test voice characteristic information substantially match the selected standard voice characteristic information. The determination is indicated by an output determination signal for authorizing the local processing unit 31-1 to proceed further transaction involving the administrative processing unit 32. In summary, the above described preferred embodiment substantially processes the input voice data at the local processing unit.

Figure 5:
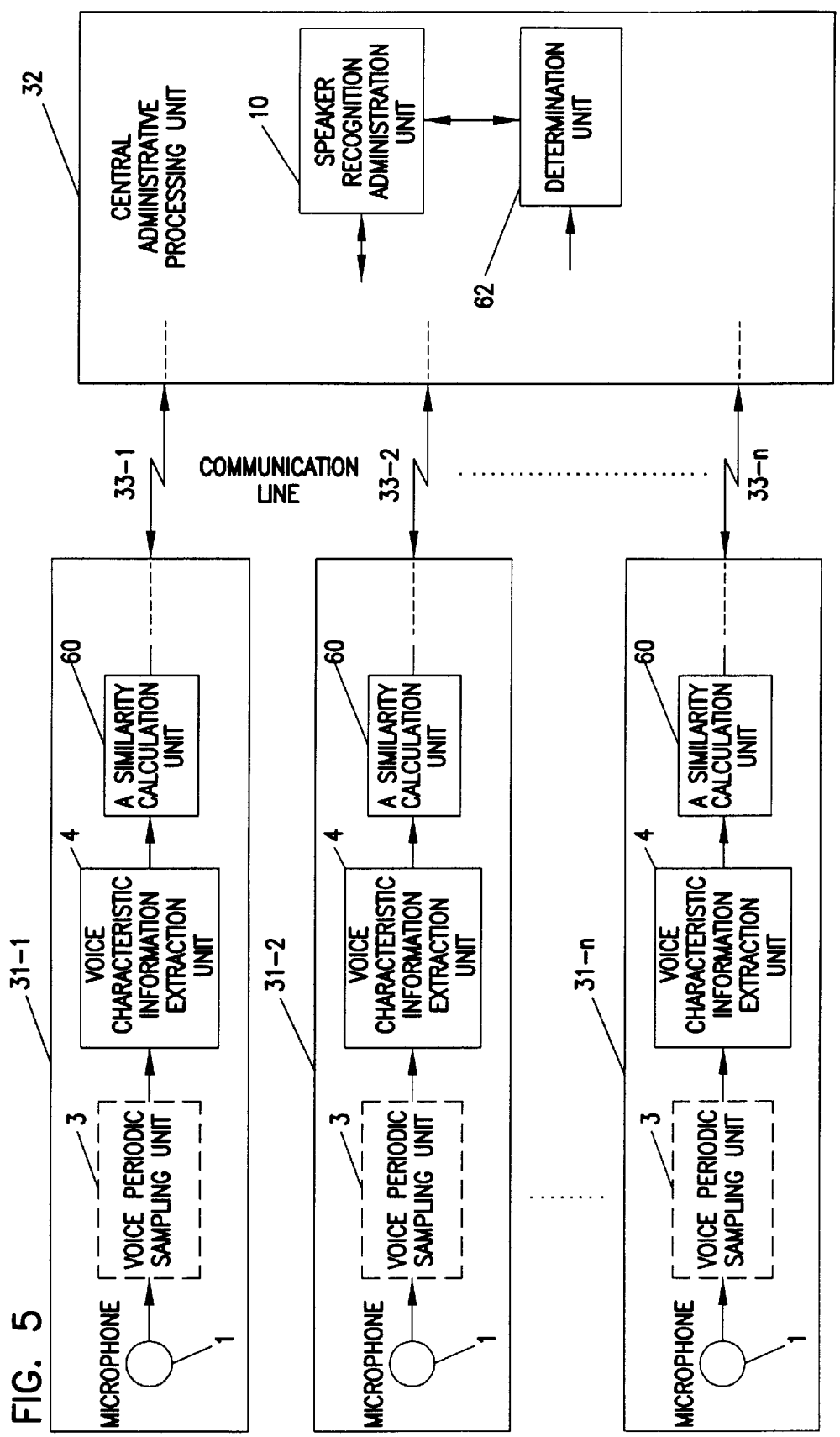
FIG. 5 diagrammatically illustrates a second preferred embodiment of the speaker recognition system according to the current invention.

Now referring to FIG. 5, a second preferred embodiment of the speaker recognition system is illustrated.

The second embodiment is substantially similar to the first embodiment as shown in FIG. 4, and each of these two preferred embodiments includes some identical components that are referenced by the same reference numbers. However, in the second embodiment, the local processing units 31-1 through 31-n each contain a similarity calculation unit 60 in lieu of the speaker recognition unit 7. The administrative processing unit 32 of the second preferred embodiment also includes a determination unit 62. In general, the second embodiment differs from the first embodiment in that the determination unit 62 determines the speaker recognition in the administrative processing unit 32. In other words, as a result of comparison between the standard and test voice characteristic information, the similarity calculation unit 60 generates a similarity signal indicative of the degree of the similarity. Then, each local processing unit 31-1 through 31-n sends the similarity signal to the administrative processing unit 32 via the communication line 33-1 through 33-n. In response, the determination unit 62 determines if the degree of similarity is sufficient to authorize further transactions based upon a predetermined threshold value. Preferably, the threshold value is predetermined for each individual user, each type of transactions and so forth. However, the common threshold value may be also used. In summary, in the second preferred embodiment of the speaker recognition system according to the current invention, the local processing units 31-1 through 31-n partly delegate the speaker recognition decision to the central administrative processing unit 32.

Figure 6:
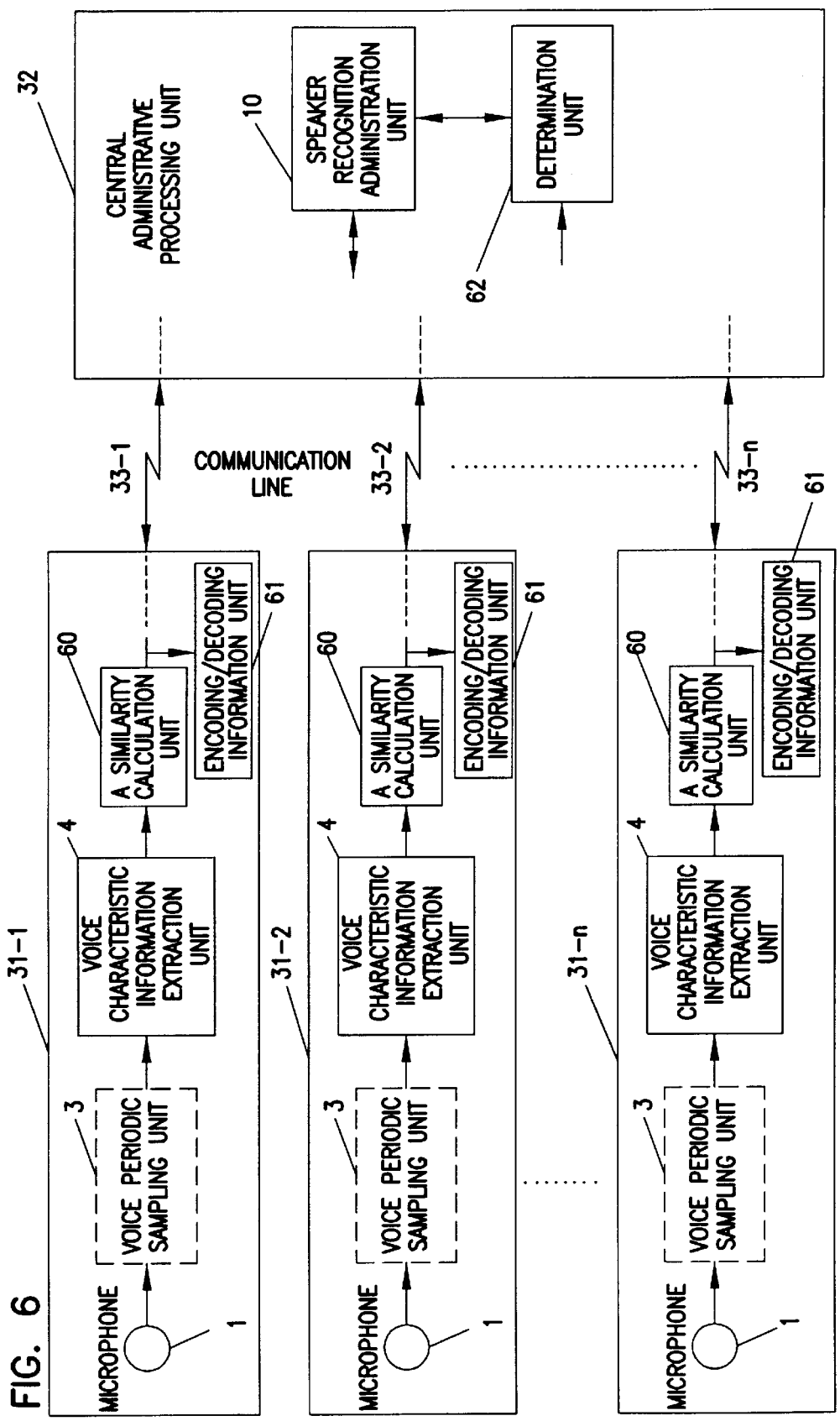
FIG. 6 diagrammatically illustrates a third preferred embodiment of the speaker recognition system according to the current invention.

Now referring to FIG. 6, a third preferred embodiment of the speaker recognition system is generally similar to the above described second preferred embodiment as shown in FIG. 5. The components are referenced by the same reference numerals as in the second preferred embodiment. However, each of the local processing units 311 through 31-n of the third preferred embodiment includes an additional or second determination unit 61. The second determination unit 61 is alternately used with the centrally located determination unit 62. In other words, the determination decision is made by either the locally located determination unit 61 or the centrally located determination unit 62 based upon a selection signal. Preferably, the determination units 61 or 62 determines the speaker recognition using distinct threshold values to differentiate the degree of speaker recognition for various transaction types. However, the determination units 61 and 62 may share a common threshold value.

In general, the lower the threshold value the determination unit uses, the more readily the determination unit determines a substantial match or a substantial similarity between test voice characteristic information and standard voice characteristic information. For this reason, a low threshold value should not be used in the speaker recognition for authorizing important or highly-secured transactions such as financial transactions. On the other hand, high threshold values generally secure the authorization based upon the speaker recognition since the match has to be more precise. For example, at a high threshold, it is harder for an impostor to improperly gain authorization for transactions. While the high threshold values in the speaker recognition process substantially reduce the false acceptance rate, the high threshold values also undesirably cause false rejections in the speaker recognition.

Referring back to FIG. 6, based upon the above described general trade-off between a high and low threshold values, a predetermined range of threshold values is used. For example, if the determination unit 61 is used for the purpose of gaining access to a certain database located in the local processing unit 31-1, the determination unit 61 uses a predetermined low threshold value since the access does not affect shared database located in the administrative central processing unit 32. An alternative embodiment of the local processing unit 31-1 also contains certain standard voice characteristic information so that no communication to and from the administrative processing unit is necessary for the above described local transaction. On the other hand, the determination unit 62 is used for the purpose of gaining access to the shared database located in the central processing unit 32, the determination unit 62 preferably uses a predetermined high threshold value since the access does affect the shared database located in the administrative central processing unit 32.

Still referring to FIG. 6, a plurality of threshold values is stored in a table in the speaker recognition administrative unit 10, and the administrative processing unit 32 selects a threshold value depending upon a circumstance and sends the selected threshold value to a local processing unit 31-1. Alternatively, a plurality of threshold values is stored in a table in the determination unit 61, and the determination unit 61 selects one threshold value based upon a selection signal sent by the speaker recognition administrative unit 10. According to one embodiment, the selection signal is transmitted along with standard voice characteristic information. Although the above described threshold values are used in connection with the similarity signal, the same concepts are applicable to the substantial match comparison as described in reference to the recognition unit 7 as shown in FIG. 4. Furthermore, by the similar mechanisms, a selected value is specified for a variable voice periodic sampling unit to modify a threshold value for separating voice data portions.

Figure 7:
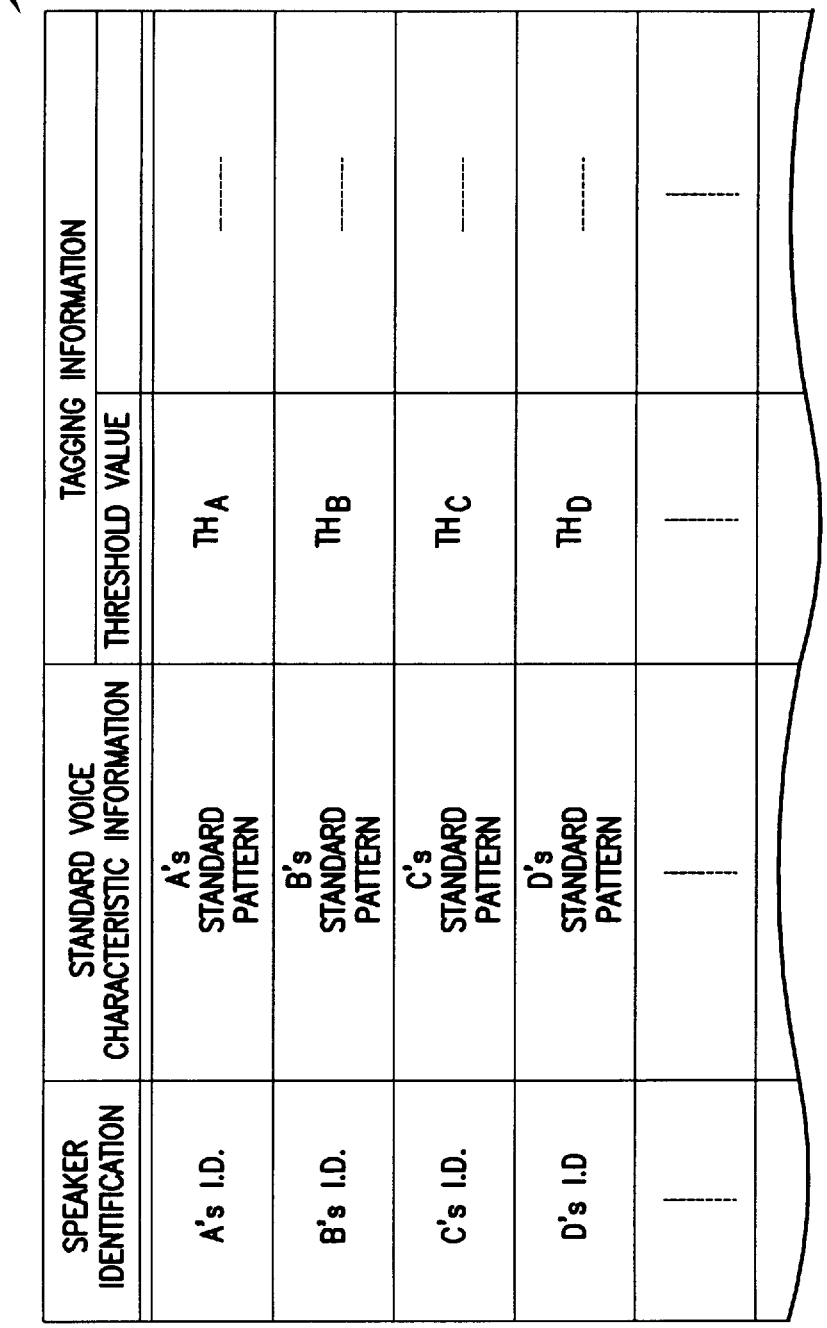
FIG. 7 is an example of a table format for storing information including threshold values for the speaker recognition process.

Referring to FIG. 7, the content of the above described table is illustrated. In addition to the speaker ID and the standard voice characteristic information for each speaker registered in the system, the table also contains tagging information. For example, the tagging information includes a threshold value corresponding to each speaker. However, the tagging information is not limited and includes various information based upon the implementation.

Figure 8:
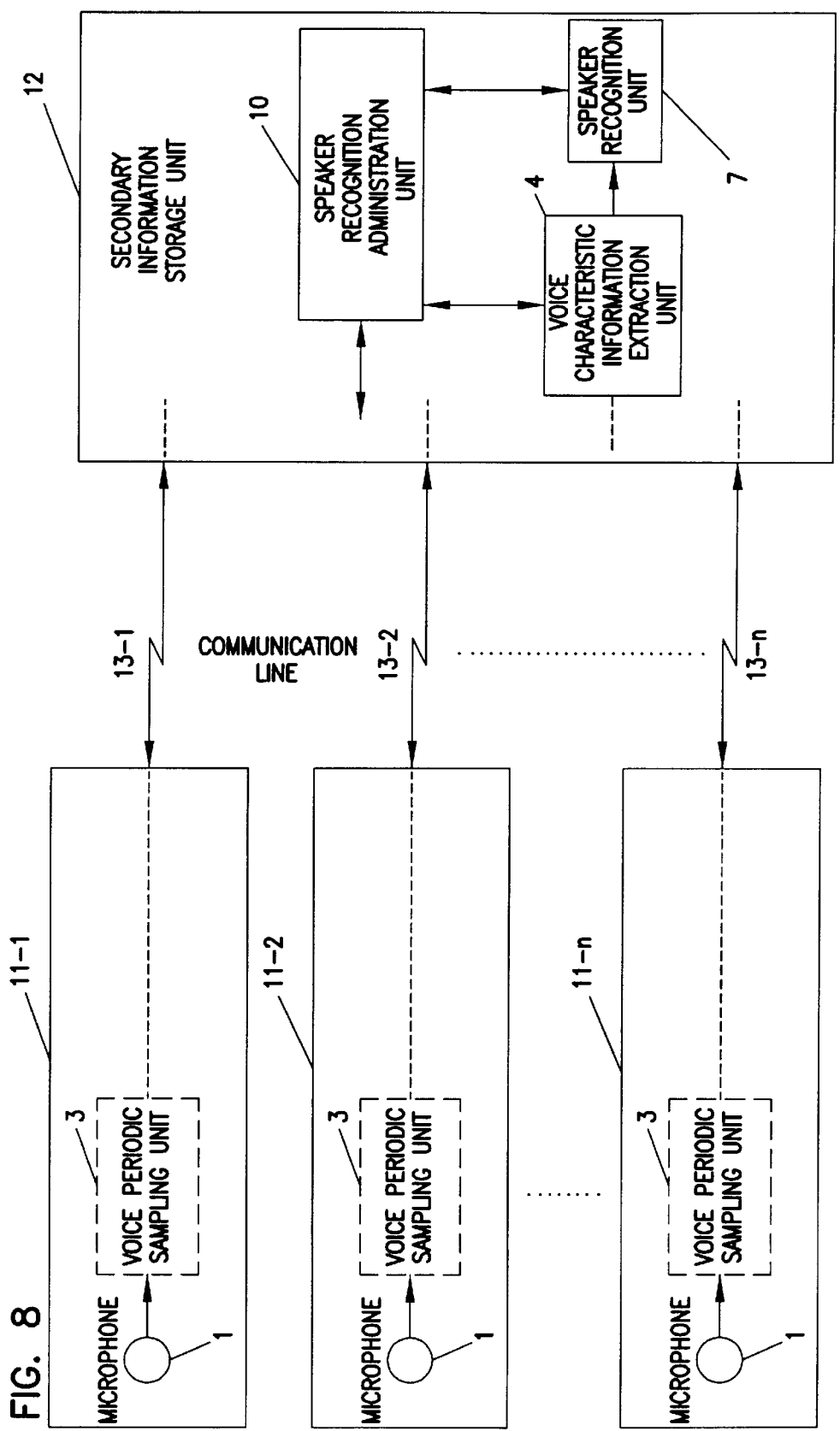
FIG. 8 diagrammatically illustrates a fourth preferred embodiment of the speaker recognition system according to the current invention.

In contrast to the above described preferred embodiments as illustrated in FIGS. 3–7, other preferred embodiments as illustrated in FIGS. 8–14 rely upon an administrative processing unit to generate the voice characteristic information from the voice data input rather than to rely upon a local processing unit. Referring now to FIG. 8, local processing units 11-1 through 11-n are respectively connected via communication lines 13-1 through 13-n to an administrative central processing unit 12. Each local processing unit 11-1 through 11-n includes at least a microphone for inputting voice data and a voice periodic sampling unit for extracting voice data portions or intermediate voice characteristic information from the voice input which includes both the voice data portions and nonvoice data background portions. The voice data portions or voice characteristic information is distinct from the voice characteristic information which is used for determining a substantial match or a degree of similarity between the input voice and the registered voice. To further proceed for the speaker recognition, the local processing unit 11-1 transmits the voice data portions or the intermediate voice characteristic information to the administrative processing unit 12 via the communication line 13-1.

Still referring to FIG. 8, the administrative processing unit 12 includes at least a speaker recognition administration unit 10, a voice characteristic extraction unit 4 and a voice recognition unit 7. Prior to the speaker recognition, the voice characteristic extraction unit 4 extracts voice parameters and generates a test voice characteristic information from the voice data portions transmitted by the local processing unit 11-1. The voice parameters generally include spectrum, cepstrum and linear prediction coefficient. Based upon the voice parameters, the voice characteristic extraction unit 4 generates a voice characteristic pattern or final voice characteristic information. For example, five to ten voice parameters are extracted from the corresponding number of 10–20 millisecond periods, and these voice parameters are placed together to generate one voice characteristic pattern or one piece of final voice characteristic information. The above described time length and the number of the periods is languagedependent. For example, the Japanese language has a large number of 4-syllable words and typically pronounced in a 200 ms period. Using this example, if 10 voice parameters are extracted from each of twenty 10-ms periods, a 10×20 matrix is generated as final voice characteristic information or a voice characteristic pattern. Using the above voice characteristic pattern, the voice recognition unit 7 determines whether it substantially matches the corresponding standard voice characteristic pattern stored in the speaker voice administration unit 10.

Figure 9:
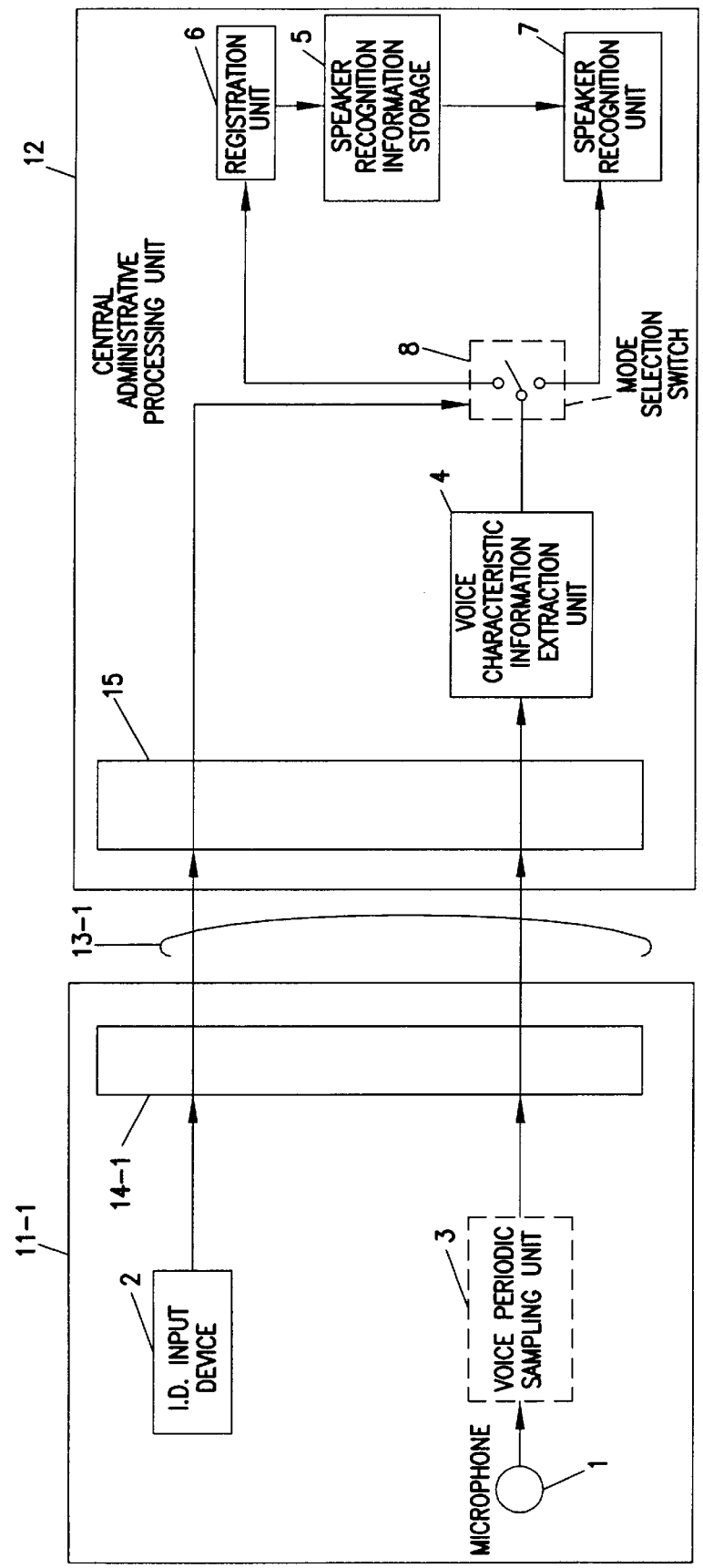
FIG. 9 is a detail illustration of a part of the fourth preferred embodiment as shown in FIG. 8.

Now referring to FIG. 9, one of the local processing unit 11-1 and the administrative central processing unit 12 are illustrated in details. The same reference numerals are used to indicate the same components as shown in FIG. 8. The local processing unit 11-1 such a bank teller machine additionally includes a speaker identification unit 2 such as a key pad to input a preassigned information such as an ID number. This input is transmitted to the administrative central unit 12 through the communication line 13-1 via communication interfaces 14-1 and 15. In the administrative central processing unit 12, the voice characteristic extraction unit 4 extracts the final voice characteristic information such as a voice characteristic pattern from the intermediate voice characteristic information such as voice data portion. Depending upon the mode set by the mode selection switch 8, the final characteristic voice information is registered in a table as a standard voice pattern in the speaker recognition storage unit 5 or is used as a test voice pattern in the speaker recognition unit 7.

In the above described preferred embodiment as shown in FIGS. 8 and 9, a significant portion of the speaker recognition process takes place in the administrative processing unit rather than in the local processing unit. The local processing unit 11-1 transmits the intermediate voice characteristic information to the administrative processing unit 12 via the communication line 13-1 so that the administrative processing unit generates voice parameters and voice characteristic information. This preferred embodiment is advantageous in maintaining and updating the speaker recognition process since the critical elements are centrally located in the administrative processing unit 12. In other words, for example, if the speaker recognition process is to be updated, only the central processing unit needs to be updated. Another advantage is that it is harder to tamper the recognition process or unit since it is not locally located. Yet another advantage is that the intermediate voice data substantially reduces the amount of data transfer from the local processing unit to the central processing unit. At the same time, the intermediate voice characteristic data is less likely to be tampered for the final speaker recognition process. In other words, the intermediate data provides sufficient security in the data transmission.

Referring to FIG. 10, one example of the table in the speaker recognition storage unit 5 is illustrated.

For each speaker, the table contains entries for the corresponding standard voice pattern and the secondary information including a data of the update for the current standard voice pattern, a threshold value and etc.

Figure 11:
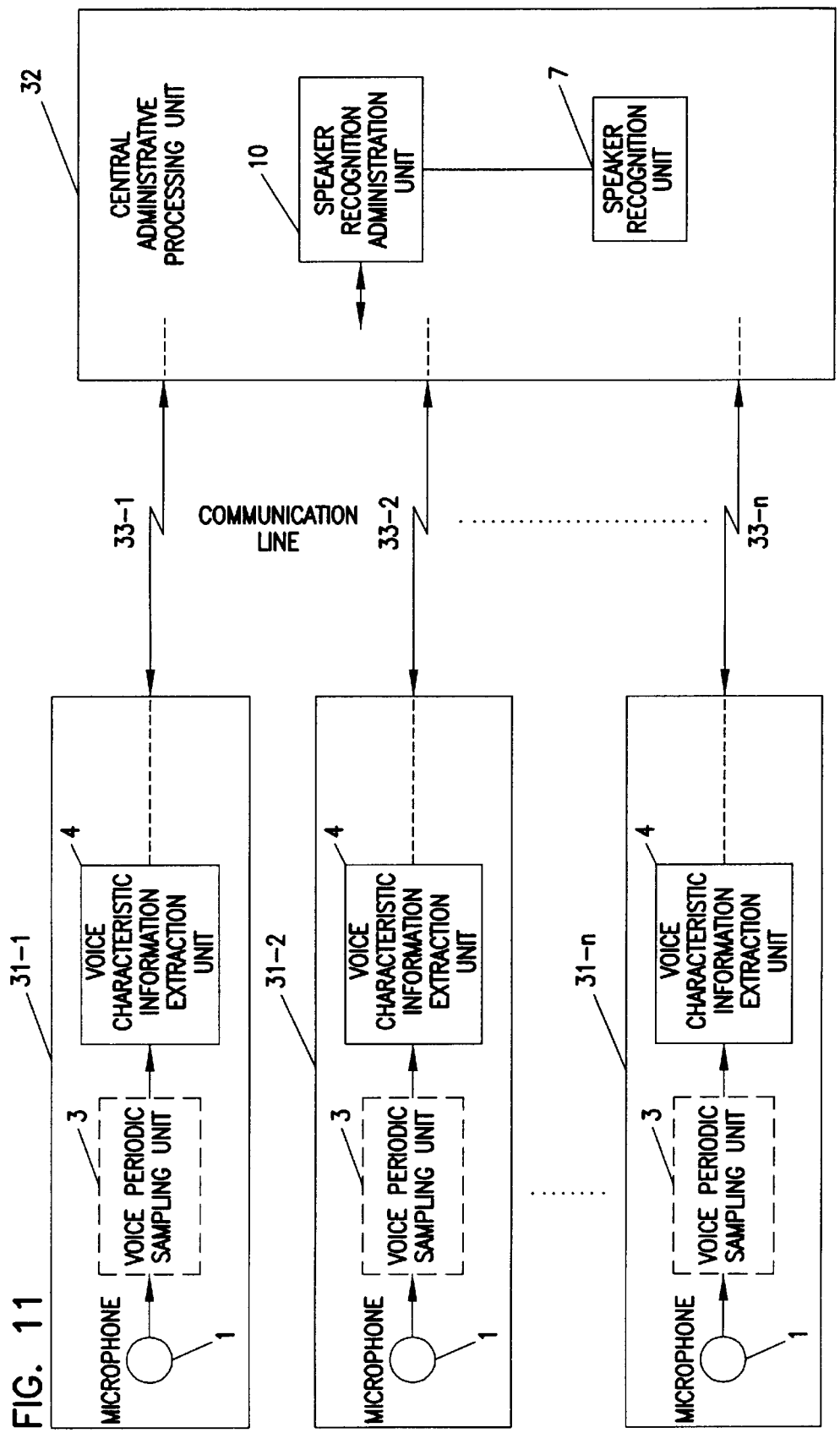
FIG. 11 diagrammatically illustrates a fifth preferred embodiment of the speaker recognition system according to the current invention.

Now referring to FIG. 11, another preferred embodiment of the current speaker recognition system substantially shares the voice data processing between the local processing unit and the administrative central processing unit. This embodiment is substantially similar to one as shown in FIGS. 8 and 9, and each of these two preferred embodiments includes some identical components that are referenced by the same reference numbers. However, in this embodiment, the local processing units 31-1 through 31-n each contain the voice characteristic extraction unit 4. In other words, the local processing unit 31-1 transmits the final voice characteristic information rather than the intermediate voice characteristic information to the speaker recognition unit 7. The administrative central processing unit 32 performs the final determination process in the speaker recognition unit 7. According to one example, the determination is made based upon a degree in similarity or in difference between the test final voice characteristic information and the corresponding standard voice characteristic information. Furthermore, the final determination is made by comparing the above described degree to a predetermined threshold value. For example, if the degree in difference is within the predetermined threshold value, the speaker recognition is affirmed.

Figure 12:
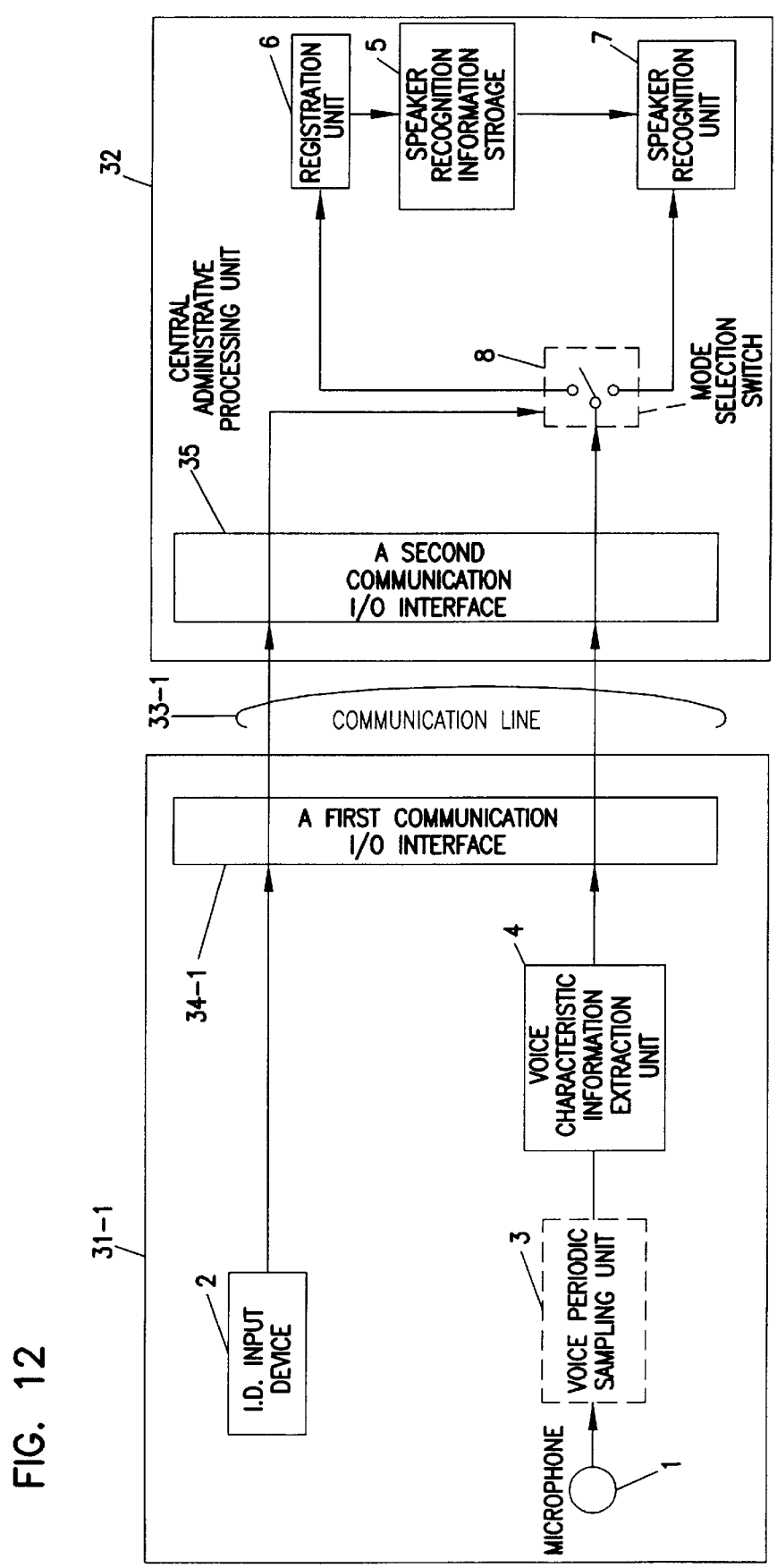
FIG. 12 is a detail illustration of a part of the fifth preferred embodiment as shown in FIG. 11.

FIG. 12 illustrates some more components in the local processing unit 31-1 and the administrative central processing unit 32 of the preferred embodiment as shown in FIG. 11. In general, each of these components performs substantially the same functions as the correspondingly referenced components in other preferred embodiments. Since this preferred embodiment has a centrally located element 7 as well as locally located elements 3 and 4 for the speaker recognition process, it is generally more difficult to update the elements involved in the speaker recognition process. Furthermore, it is also more susceptible to tampering at the local level due to the local voice data processing.

Figure 13:
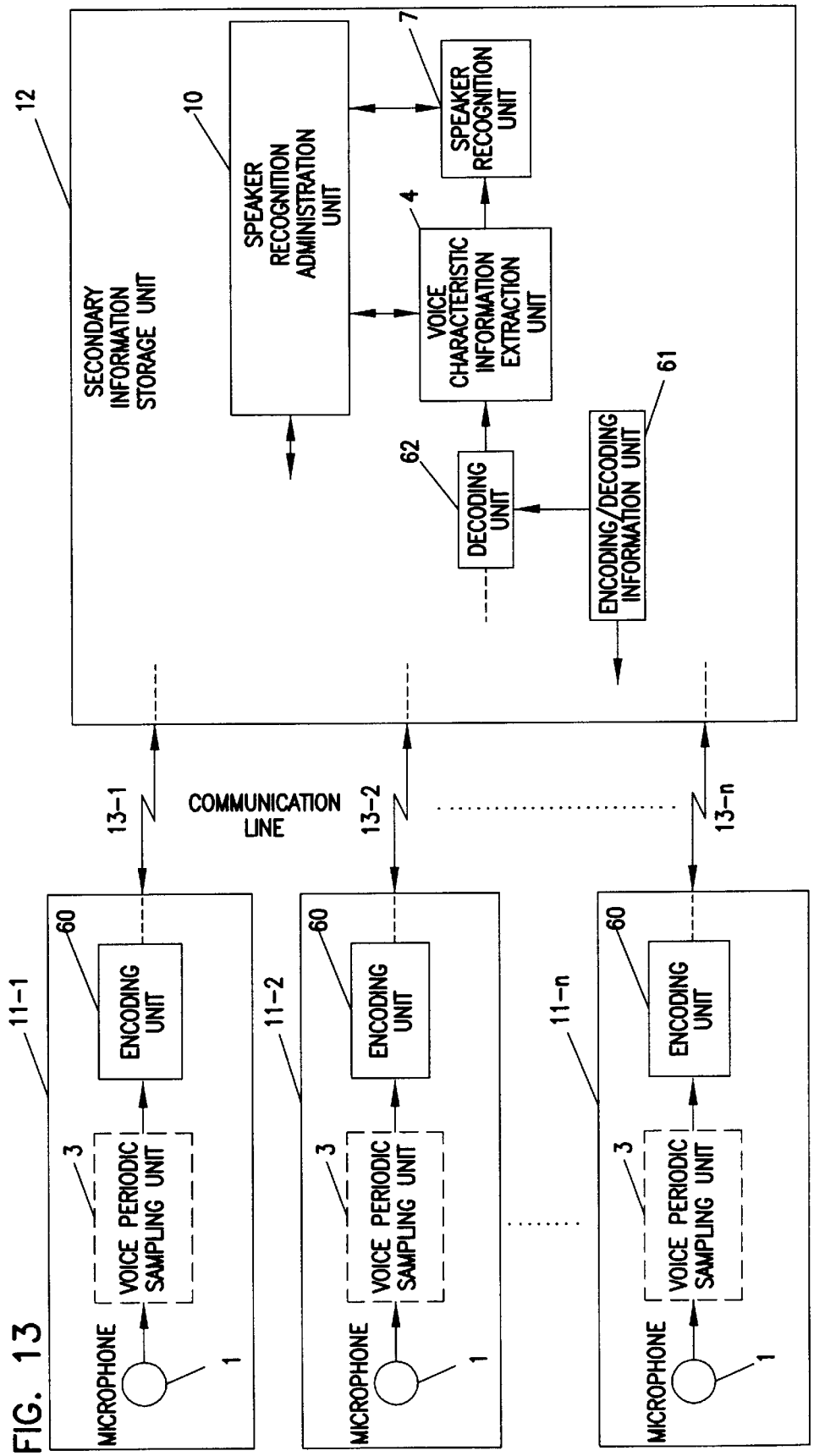
FIG. 13 diagrammatically illustrates a sixth preferred embodiment of the speaker recognition system according to the current invention.
Figure 14:
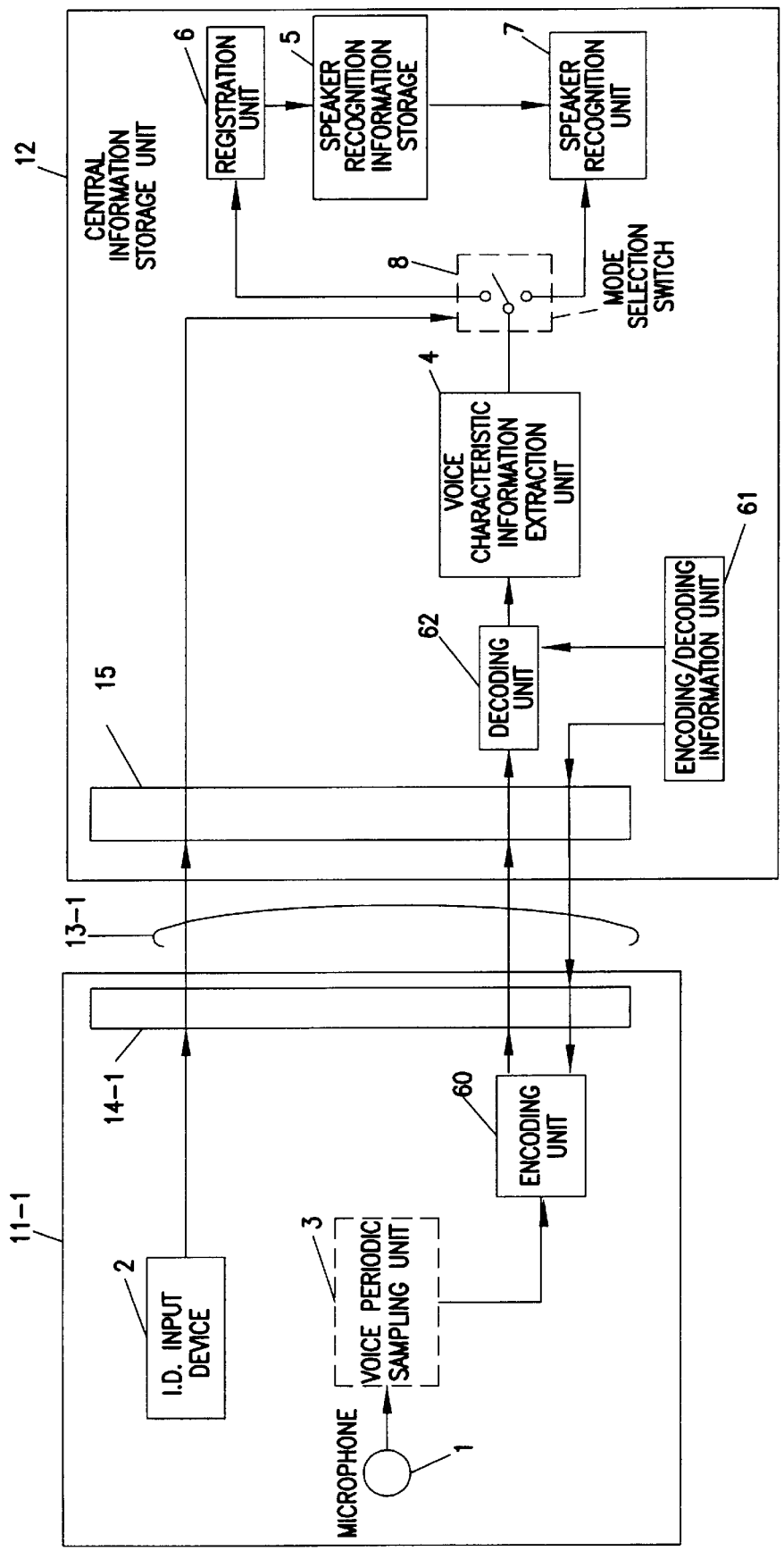
FIG. 14 is a detail illustration of a part of the sixth preferred embodiment as shown in FIG. 13.

Now referring to FIGS. 13 and 14, an alternative embodiment is illustrated according to the current invention. FIG. 14 more fully illustrates the same alternative embodiment of FIG. 13, and the same reference numerals indicate the same structural elements. In general, the alternative embodiment secures the speaker recognition process by encoding the voice data transmission. Local processing units 11-1 through 11-n each include a microphone for inputting the voice input, a periodic sampling unit 3 for separating voice data portions from non-voice data portions at a predetermined frequency as well as an encoding unit 60 for encoding the sampled voiced data. Prior to encoding the voice data, an encoding/decoding information unit 61 in the central processing unit 12 transmits a selected encoding information to the encoding unit 60. The encoding unit 60 encodes the intermediate voice characteristic information such as the voice data portions based upon the above described encoding information before transmitting to the administrative central processing unit 12 through one of communication lines 13-1 through 13-n. In the administrative central processing unit 12, a decoding unit 62 decodes the transmitted encoded intermediate voice characteristic information based upon the encoding information from the encoding/decoding information unit 61. According to one preferred embodiment, the encoding information is modified for each transaction access. The decoded intermediate voice characteristic information is processed by the voice characteristic extraction unit 4 before the final speaker recognition determination by the speaker recognition unit 7.

Figure 15:
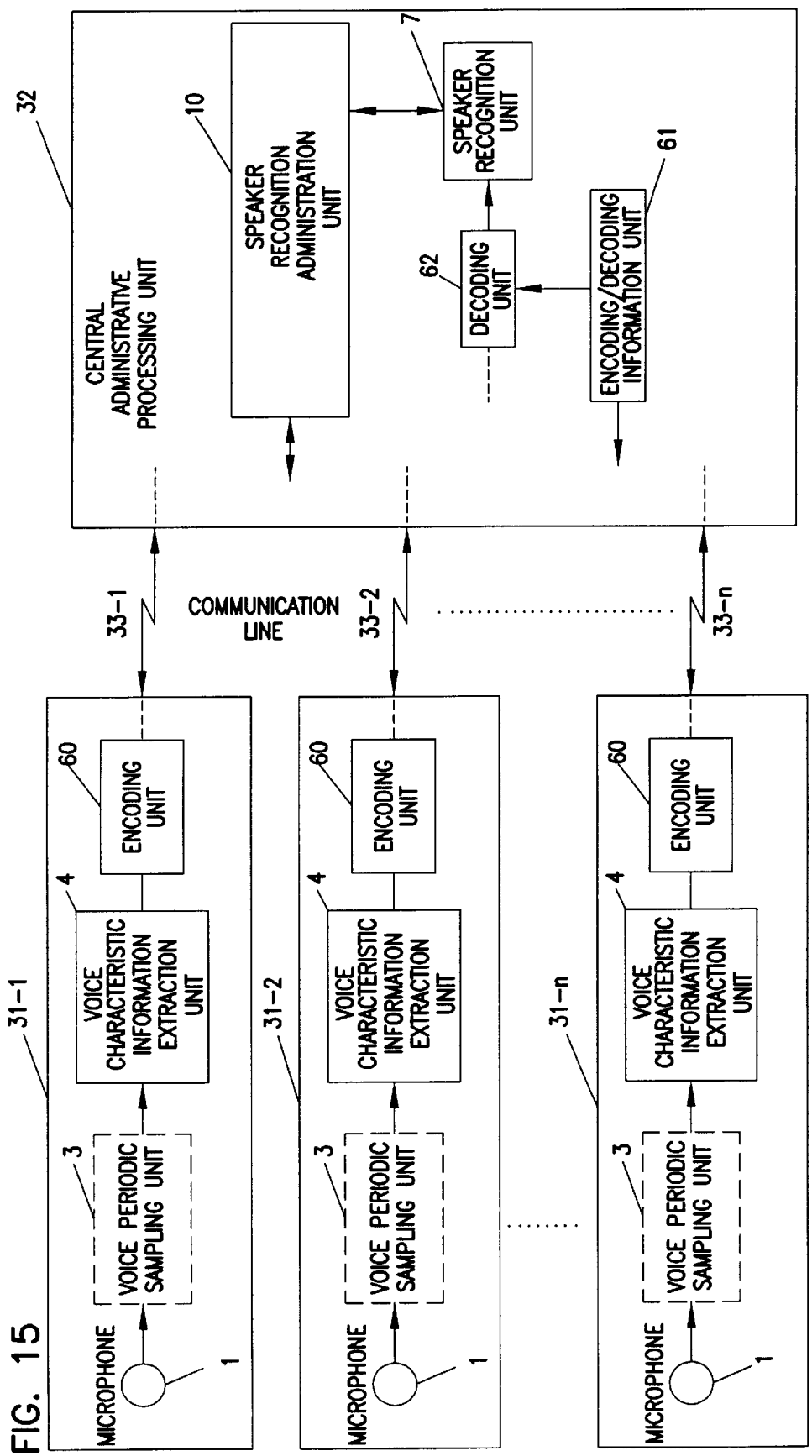
FIG. 15 diagrammatically illustrates a seventh preferred embodiment of the speaker recognition system according to the current invention.
Figure 16:
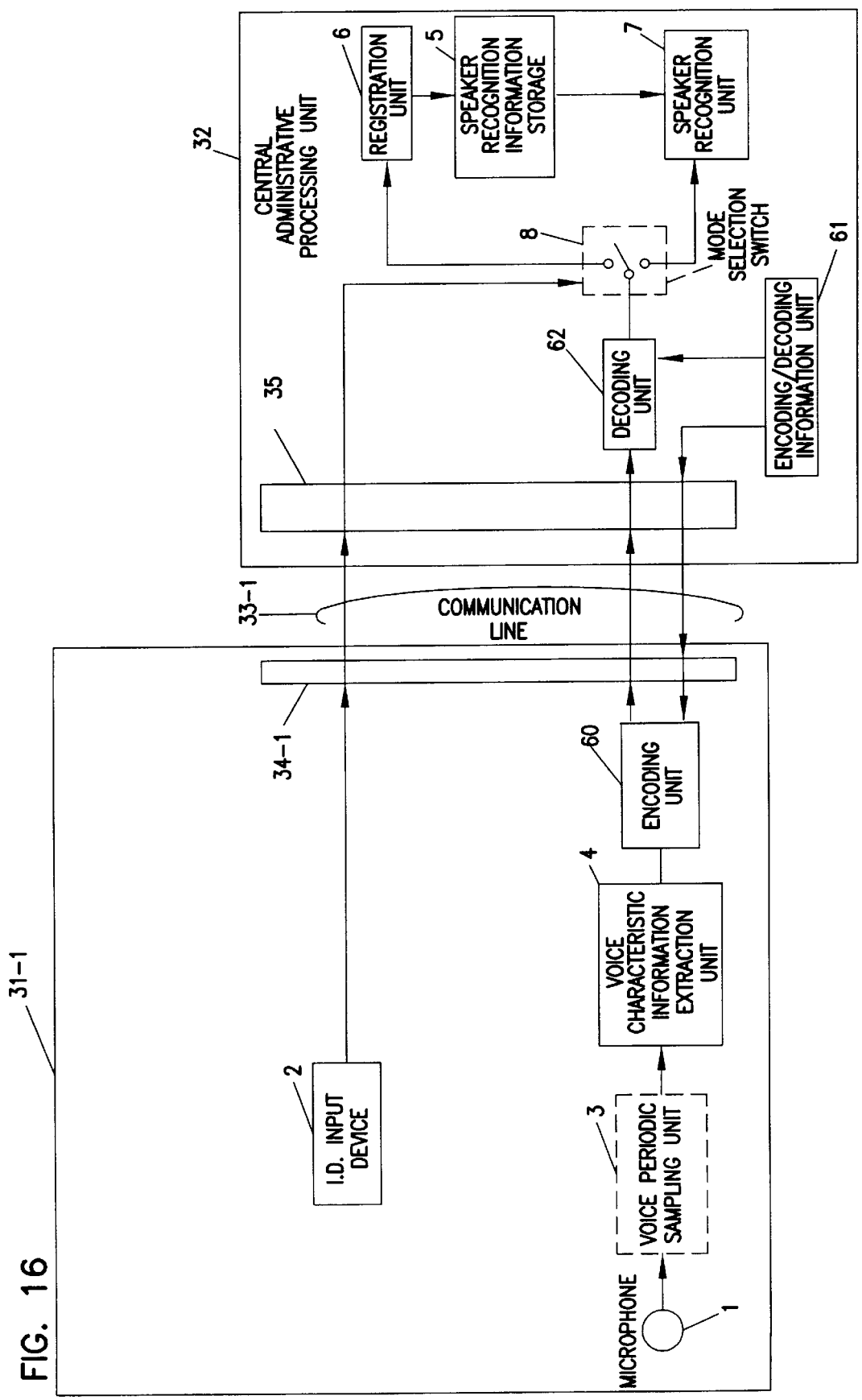
FIG. 16 is a detail illustration of a part of the seventh preferred embodiment as shown in FIG. 15.

Now referring to FIGS. 15 and 16, another alternative embodiment involving the above described encoding and decoding units. FIG. 16 more fully illustrates the same alternative embodiment of FIG. 15, and the same reference numerals indicate the same structural elements. In general, the alternative embodiment also secures the speaker recognition process by encoding the voice data transmission. This second alternative embodiment is different from the embodiment as shown in FIGS. 13 and 14 in that each of the local processing units 31-1 through 31-n includes a voice characteristic information extraction unit 4. The final voice characteristic information or a voice pattern is then encoded by an encoding unit 60 before transmitting the encoded voice characteristic information to the administrative central processing unit 32. Since the final voice characteristic information is encoded during the transmission, the transaction is substantially prevented from tampering or illegal access. As described before, the encoding information is preferably modified for each transaction. In the above alternative embodiment, although the encoding and decoding units 60 and 61 are implemented as a separate hardware elements, the encoding and decoding mechanism is also implemented as software code that can be transmitted to the local processing unit and returned to the central processing unit as a part of the encoded transmission data.

Some examples of the encoding and decoding processes are explained in the following. One example of the encoding scheme is to shuffle the order of the voice parameters during transmission. According to this example, the administrative central processing unit transmits a encoding number to the local processing unit. This number p is between 1 and n which the number of the voice parameters in the voice characteristic pattern, and the number p specifies that the p-th voice parameter is to be transmitted first. The P+1st through n-th voice parameters are then sequentially transmitted, and the 1st through p–1th voice parameters follow during the same transmission. The decoding process is to reconstruct the original order of the voice parameters based upon the encoding number. Another example includes a pair of encoding keys, and a first key is used for encoding information while the second key is used for decoding the information encoded by the first key. Each of these keys is independent and generally cannot be generated from the other. A pair of these keys is stored in the central processing unit, and only the encoding key is transmitted to the local processing unit.

Figure 17:
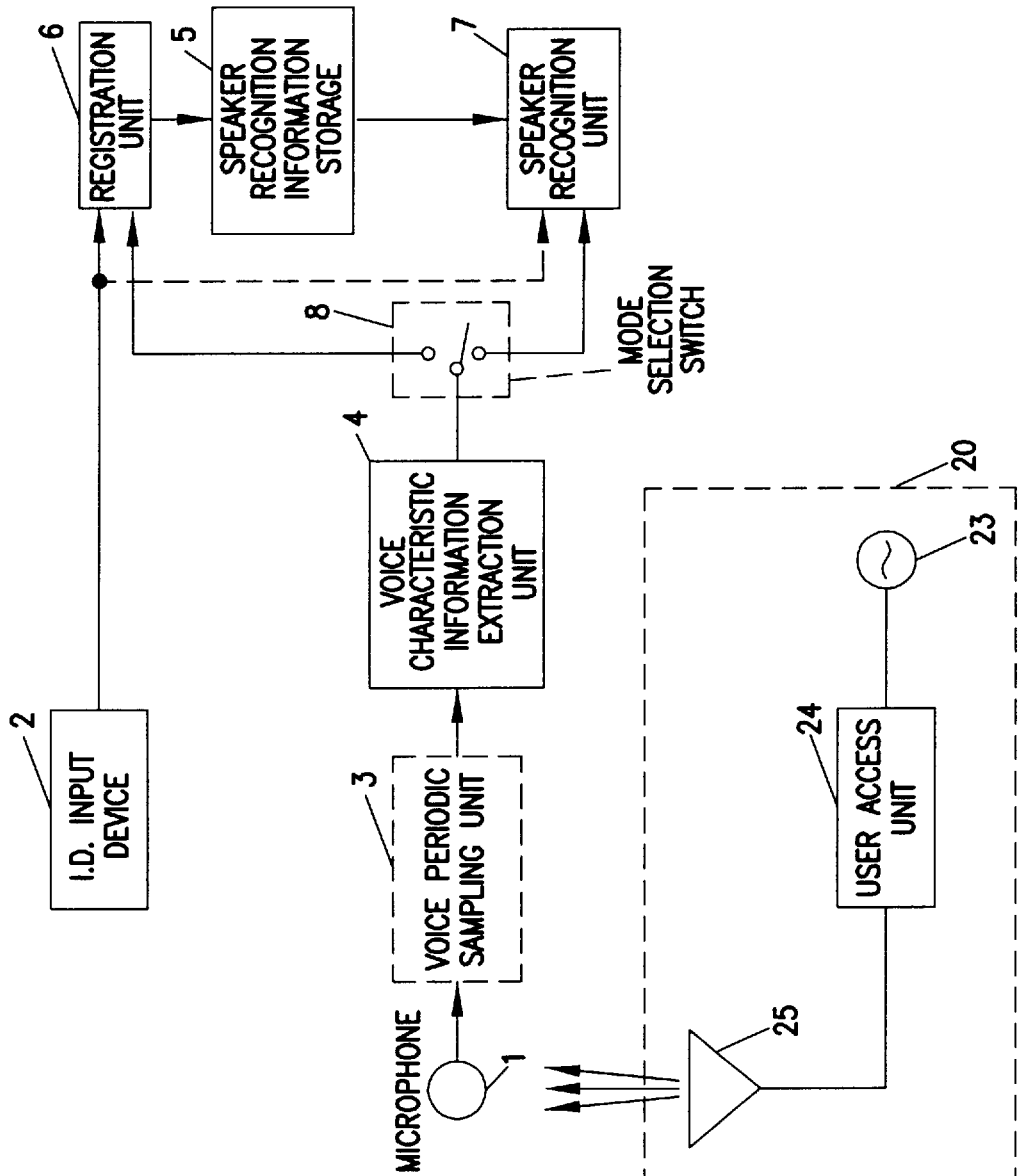
FIG. 17 diagrammatically illustrates one preferred embodiment of the sounding generating unit and the sound removing unit according to the current invention.

In contrast to the above described encoding and decoding, now referring to FIG. 17, a predetermined sound is input into the system along with the voice input for the purpose of substantially reducing inappropriate access or illegal authorization. In other words, one preferred embodiment according to the current invention substantially prevents an impostor from illegally using recorded voice of a bona fide speaker. This is generally accomplished by inputting a predetermined sound generated by a sound generating unit 20 through a microphone 1 when the bona fide speaker inputs his or her voice data through the same microphone. The sound generating unit 20 is preferably activated by the voice input of a speaker. The mixture of the voice input and the predetermined sound is processed by a voice characteristic extraction unit 4, and the voice characteristic information which still contains the predetermined sound is further process for removing it by a sound removing unit 21. If an impostor records the voice input of a bona fide registrant and the associated predetermined sound near the microphone 1 and later plays back the recorded data so as to inappropriately clear the recognition process, since the played back voice data already contains the predetermined sound, an additional or second predetermined sound is currently inputted into the system. Because of the additional or second predetermined sound, even if the sound removing unit 21 removes some of or either of the two predetermined sounds, the final voice characteristic information or pattern is substantially different from the corresponding standard one in volume or phase. As a result, the inappropriately played back voice fails to gain authorization in the speaker recognition system.

Figure 18:
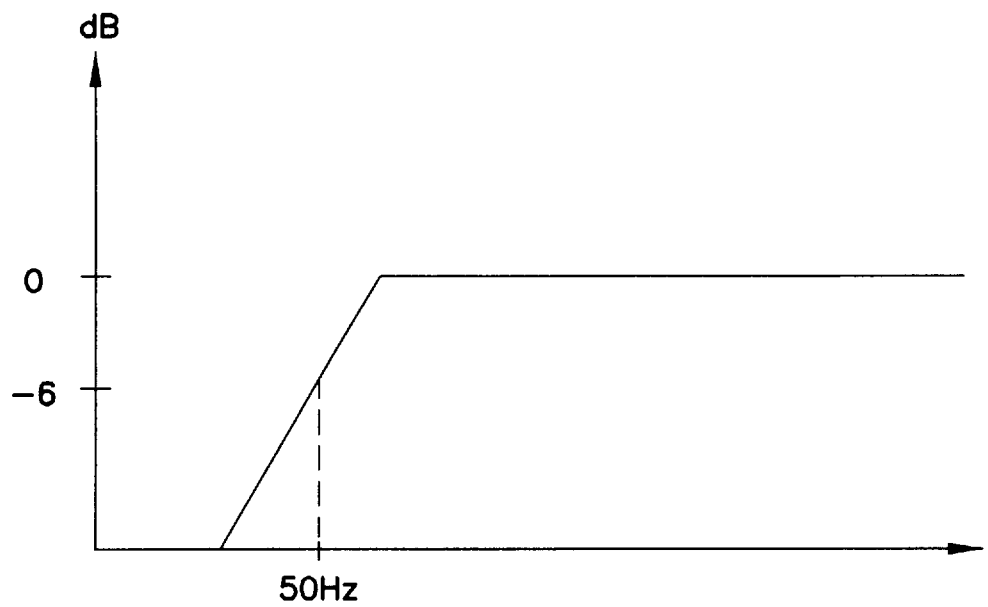
FIG. 18 is a graph depicting a desirable filtering characteristic for removing an example frequency sound of 50 Hz used in the sound removing unit of FIG. 17.

Still referring to FIG. 17, the predetermined sound generating unit 20 includes a sound generator 23, an amplifier 24 and a speaker 25. For example, the sound generator 23 generates a 50 Hz signal, and the amplifier amplifies the 50 Hz signal. The amplified 50 Hz signal is outputted through the speaker 25 while a speaker inputs his or her voice through the microphone 1. The voice characteristic information extraction unit 4 extracts final voice characteristic information which includes a mixture of the 50 Hz signal and voice parameters. The sound removing unit 21 subsequently removes the 50 Hz signal from the mixture. One preferred embodiment of the sound removing unit 21 for removing the 50 Hz signal is a filter characterized by a graph as shown in FIG. 18. The filter is set to gain –6 dB at 50 Hz so as to substantially remove the 50 Hz signal. The predetermined sound is not limited to the above described frequency, and other frequencies or complex signals are also applicable. In addition, according to one preferred embodiment, the predetermined sound is generated at a frequency outside of the human audible frequency range. Such a frequency sound least affects the voice input process since the user does not hear additional sound during his or her speech.

Figure 19:
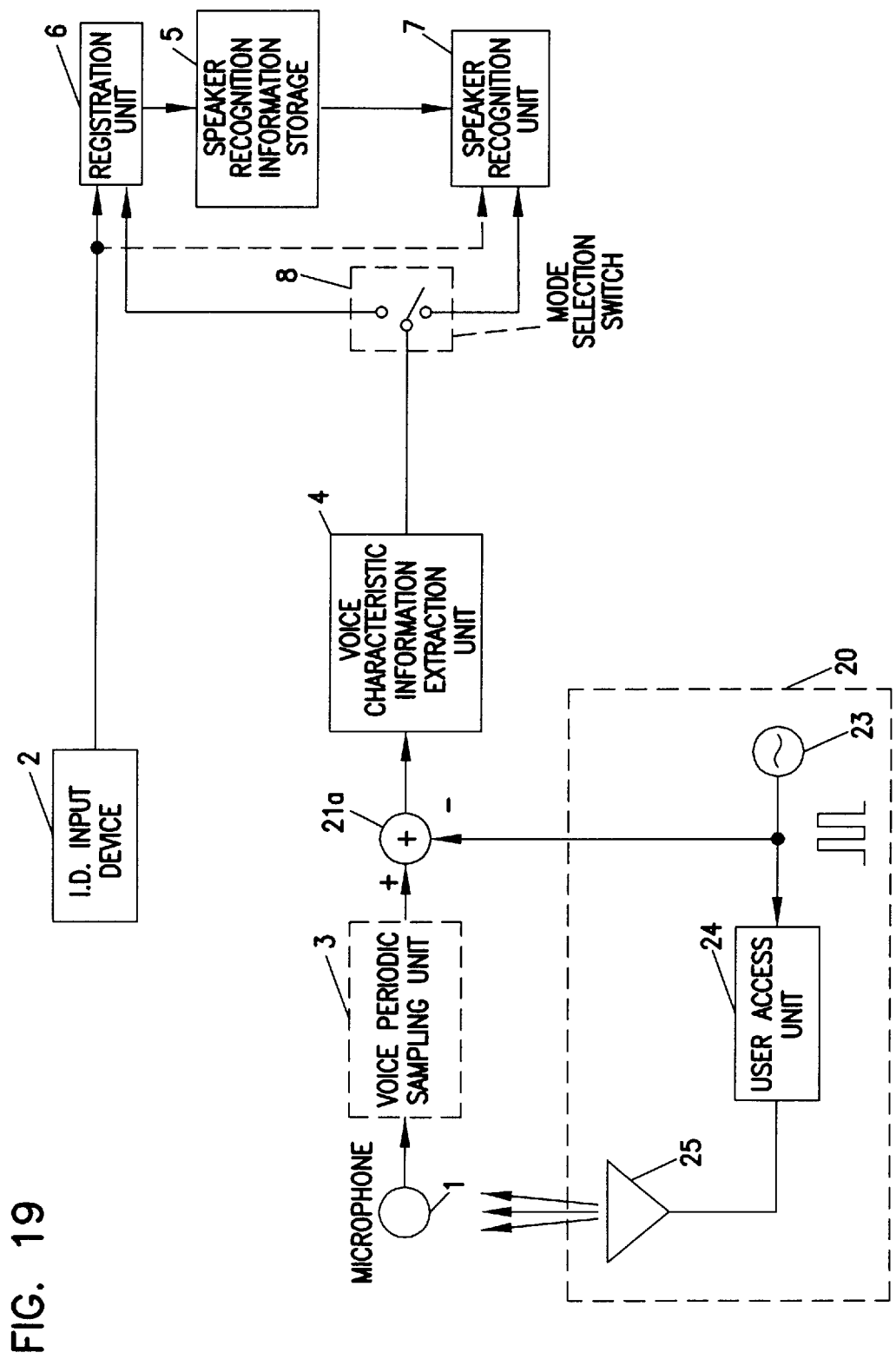
FIG. 19 diagrammatically illustrates a second preferred embodiment of the sounding generating unit and the sound removing unit according to the current invention.

Now referring to FIG. 19, a second preferred embodiment of the sound generating unit 20 according to the current invention is illustrated. The same reference numerals indicate substantially the same components as the first preferred embodiment as shown in FIG. 17. When continuous sounds such as sinusoidal waves are used as a predetermined mixing sound, and if the phase of the input signal through the microphone and that of the input signal in the sound removing unit 21 do not substantially match, it is possible that the voice input level is undesirably reduced by interference. To prevent such an undesirable situation, a series of pulses is used instead of the continuous waves. A pulse generator 23 generates a series of pulses, and an amplifier 24 amplifies the pulses. The amplified pulses are outputted through a speaker 25. The inverse pulses are simultaneously sent to an adder based signal removing unit 21a. The signal removing unit 21a removes the positive pulses by adding the corresponding negative inverse signals.

Figure 20:
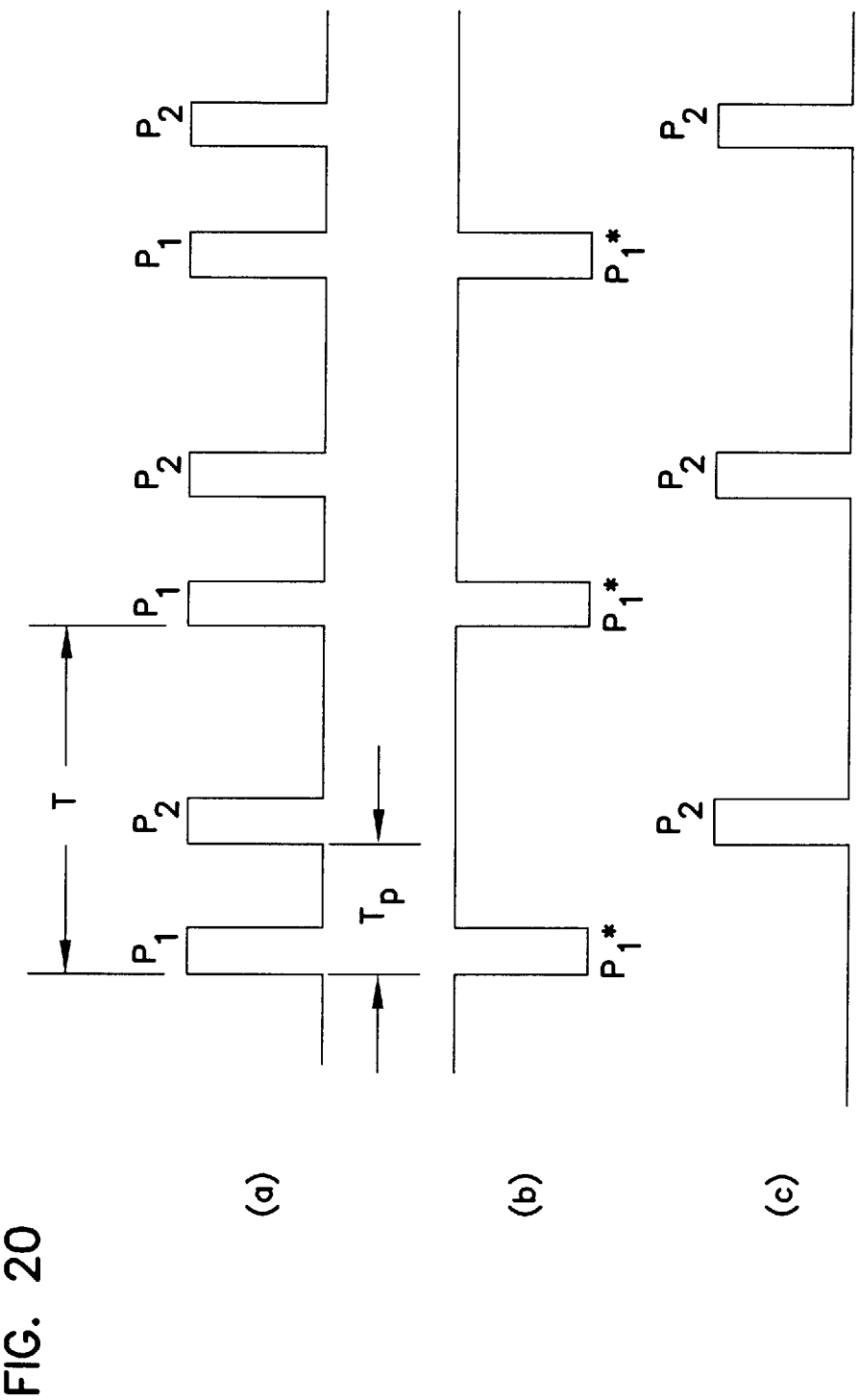
FIGS. 20A through 20C illustrate how the generated sound is removed from a voice input.
Figure 21:
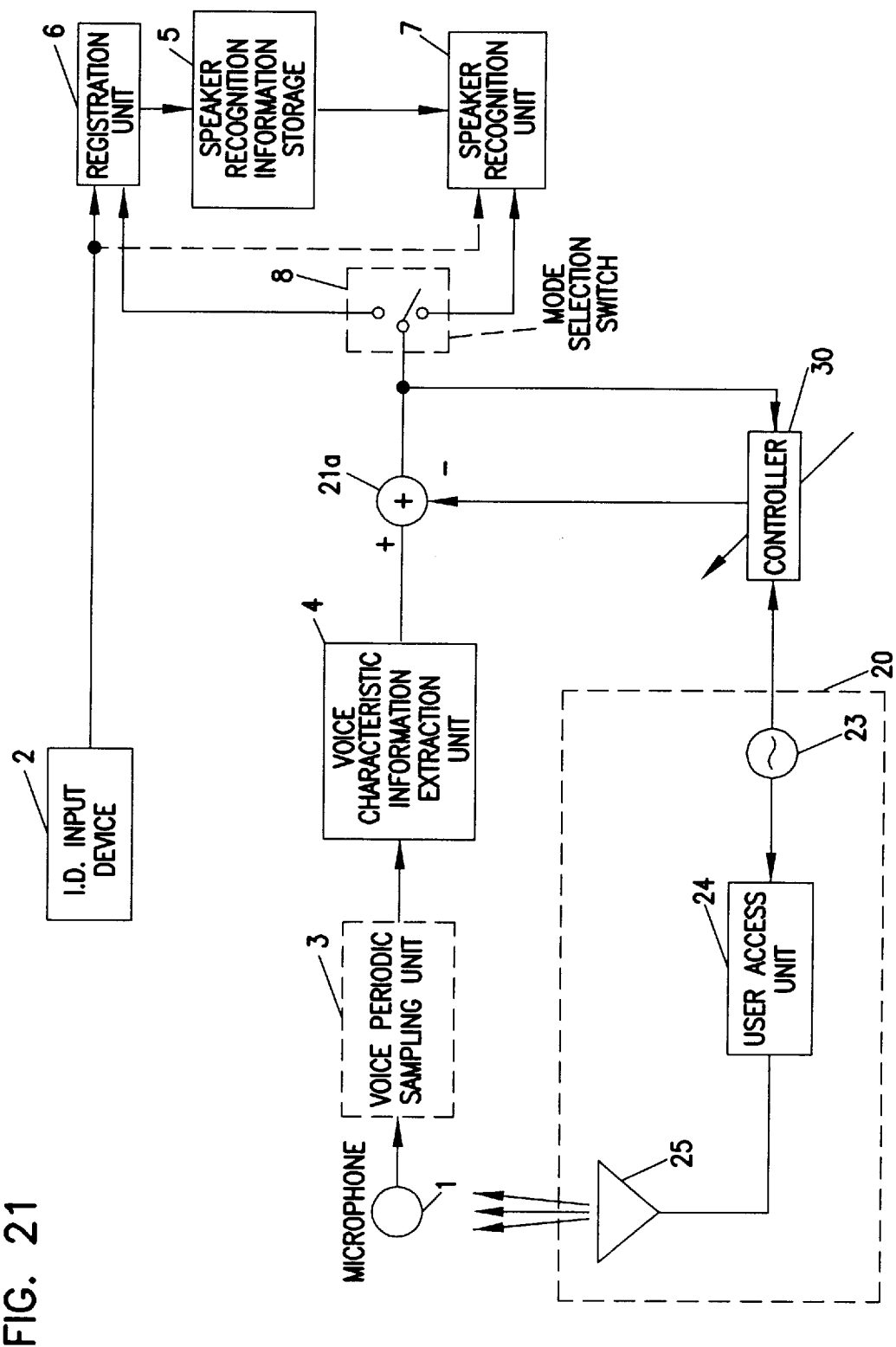
FIG. 21 diagrammatically illustrates an alternative embodiment of the sounding generating unit and the sound removing unit both of which are controlled by a controller according to the current invention.

Now referring to FIG. 20, by a similar reason as described above for the first preferred embodiment, the second preferred embodiment also substantially prevents an imposter from inappropriately using the recorded voice of a bona fide speaker. FIG. 20(a) indicates that pulses P1 are a predetermined series of sound signals while pulses P2 are exemplary voice input pulses. Both P1 and P2 are input into the speaker recognition system through a microphone. A first period T is sufficiently large, and a second period Tp is smaller and non-overlapping with T. FIG. 20(b) indicates a series of negative pulses P1* which are inverse of the pulses P1. FIG. 20(c) illustrates a result of the addition of pulses indicated in FIGS. 20(a) and 20(b). Thus, when the recorded input mixture of P1 and P2 is played back, the inappropriate use generally fails to achieve a successful speaker recognition. Furthermore, to substantially improve the timing for removing the predetermined added sounded signal, referring to FIG. 21, a signal controller 30 controls the adder based sound removing unit 21 by controlling the timing so as to minimize the output of the adder. One example of the above described process is the least mean square method as described by Widrow and Stearns in "Adaptive Signal Processing, Prentice-Hall (1985).

Figure 22:
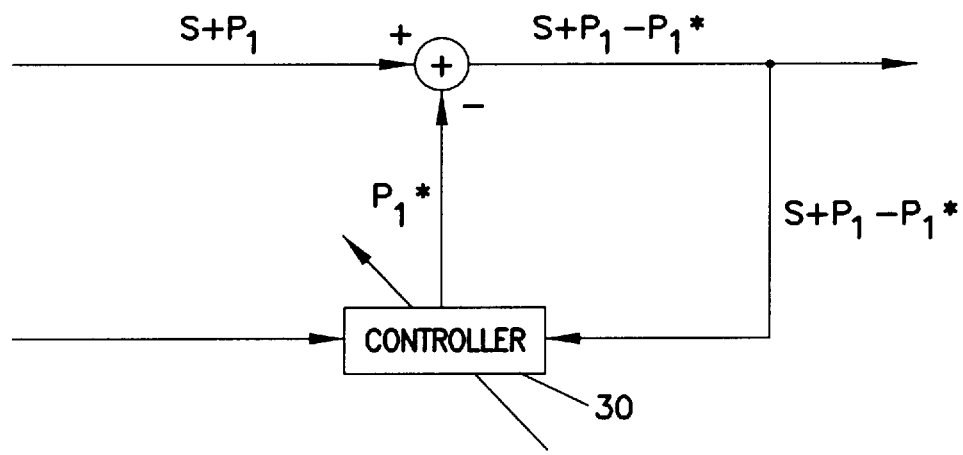
FIG. 22 more fully illustrates the function of the controller as shown in FIG. 21.

Referring to FIG. 22, in applying the least mean square value theory to the above preferred embodiment of the controller 30, S(t) is a voice signal and P1(t) and P1* are respectively a predetermined sound pulse and the corresponding inverse pulse. For the sake of simplicity, P2(t) is assumed to be included in the s(t) signal. The least mean square error is expressed by $E[((S+P1)-P1^*)^2]$. By minimizing (P1−P1*) to substantially zero, the least mean square is achieved. In other words, the controller 30 adjusts the phase of the P1* to make the phase difference between P1 and P1* substantially zero so that the output of the signal removing unit 21 is optimized to restore the original voice characteristic information. The above described controller adjustment is applicable not only to pulses but also continuous signals.

Figure 23:
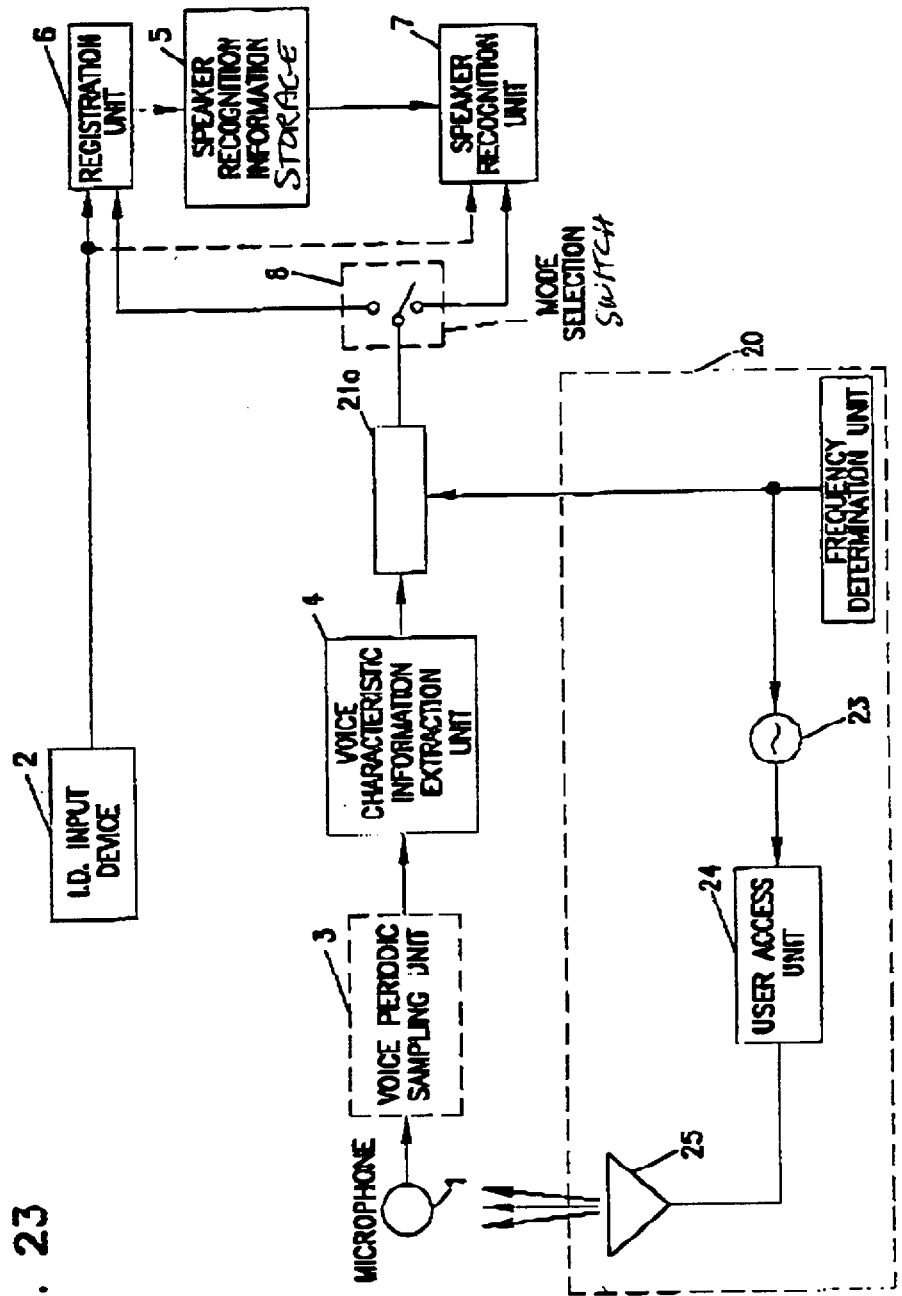
FIG. 23 diagrammatically illustrates a second alternative embodiment of the sounding generating unit and the sound removing unit of which are adjusted by a frequency determination unit according to the current invention.

Now referring to FIG. 23, another alternative embodiment according to the current invention randomizes the above described security frequency signal. This alternative embodiment is substantially similar to the preferred embodiment as shown in FIG. 17 except for a frequency determination unit 50. The frequency determination unit 50 preferably randomizes the frequency of the security signal for each transaction and transmits a frequency value signal to a signal generation unit 23 as well as to a signal removing unit 21. Based upon the frequency value signal, the signal generation unit generates the specified frequency signal to be inputted into the system along with the voice data. The signal removing unit 21, on the other hand, removes the specified frequency signal by modifying a frequency characteristic according to the frequency value signal.

Figure 24:
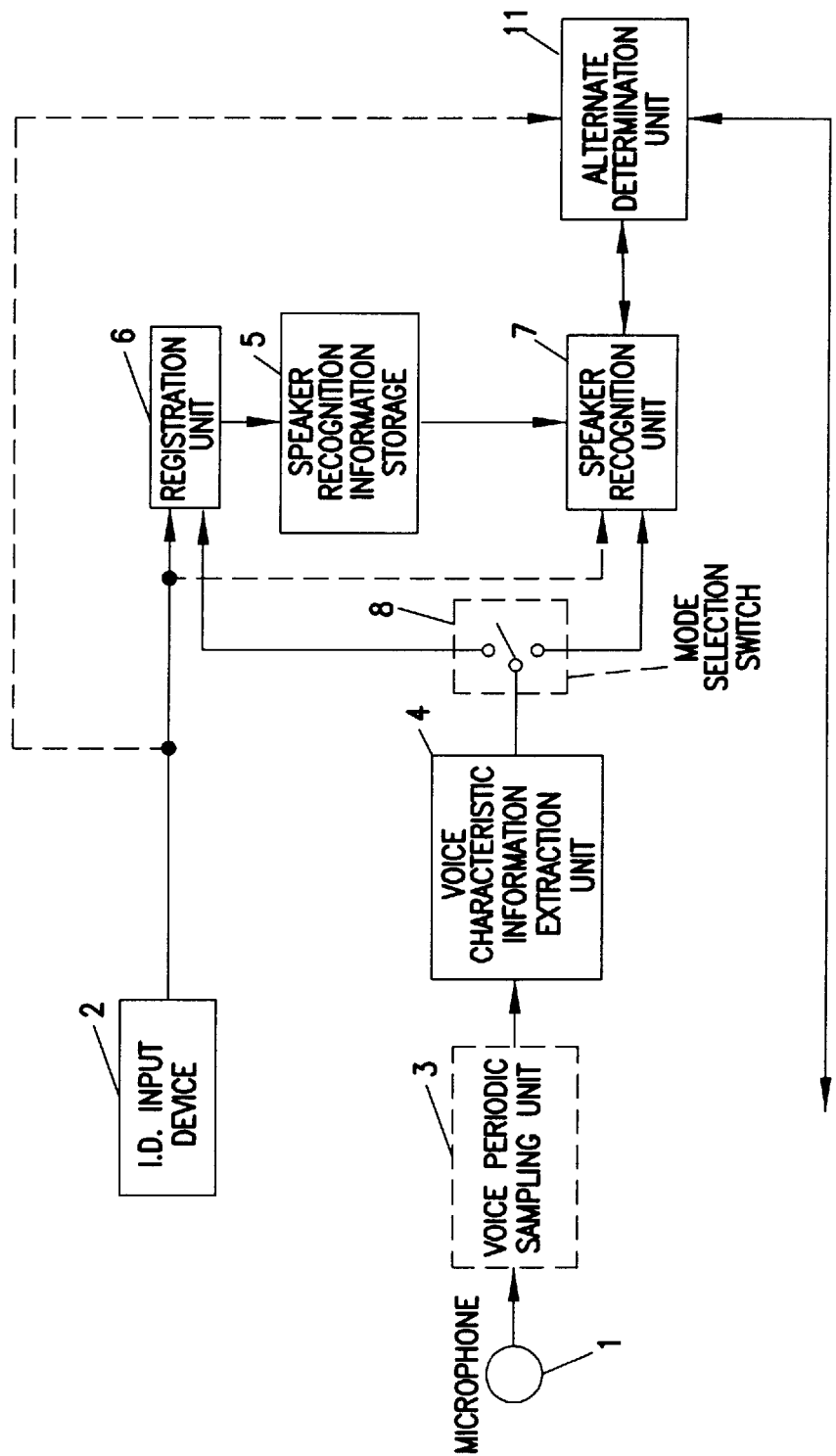
FIG. 24 diagrammatically illustrates the speaker recognition system with a security unit according to the current invention.

In addition to the above described security features for the network based speaker recognition system, the following describe additional security features when the speaker recognition process fails to recognize the bona fide user or when the user updates his or her standard voice data registration. Referring to FIG. 24, one preferred embodiment of the speaker recognition system according to the current invention includes a confirmation unit 11.

Other components are substantially identical and have been already described with respect to various embodiments. The confirmation unit 11 confirms the rejected recognition. As described above, the voice input data changes over a certain period of time and under certain circumstances. For example, a common cold affects the voice, and the speaker recognition system often fails to recognize a bona fide user who is affected by the cold. The confirmation unit 11 provides an alternative method or components to identify the user in response to the failure to the voice recognition.

Figure 25:
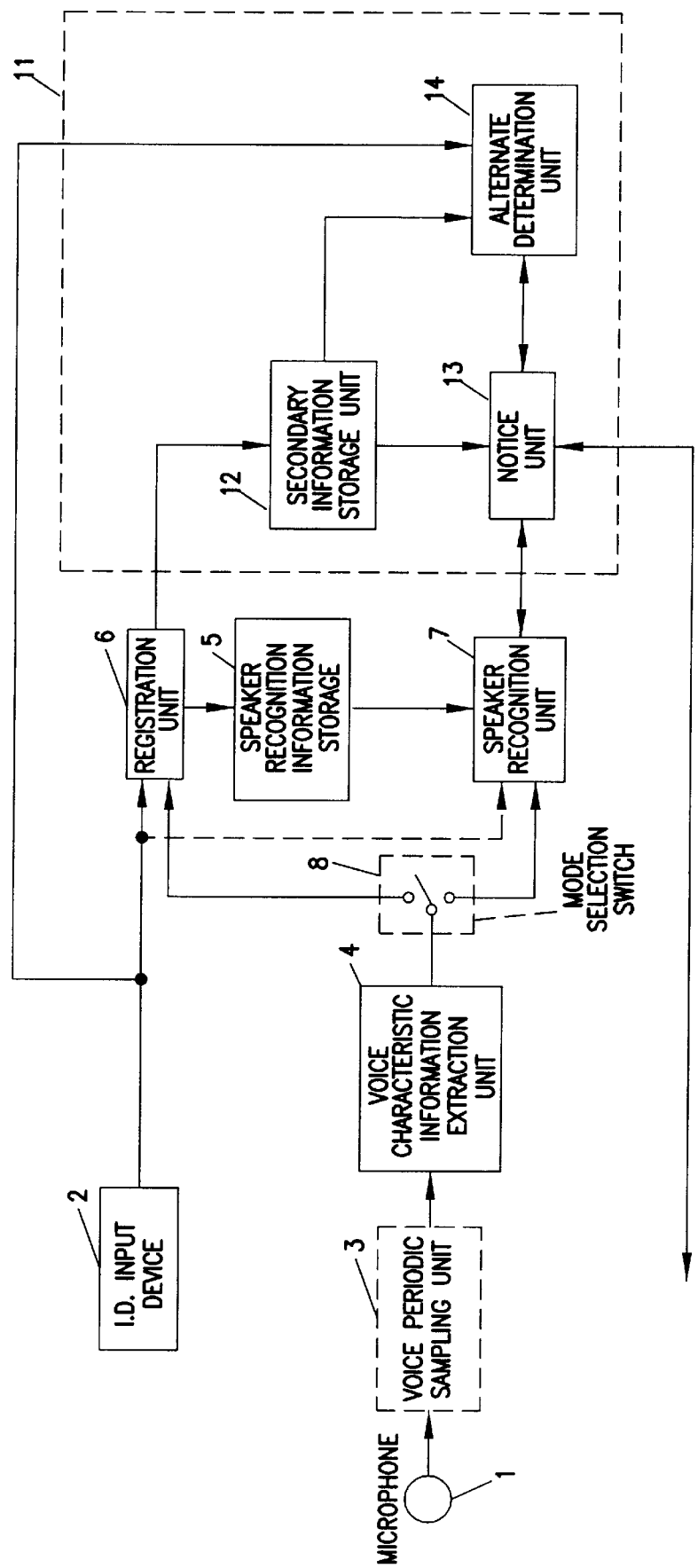
FIG. 25 is a detail illustration of the security unit as shown in FIG. 24.

Referring to FIG. 25, the confirmation unit 25 is more fully illustrated to include a secondary information storage unit 12, a notice unit 13 and an alternate determination unit 14. When the bona fide user's voice input is determined not to match his or her registered standard voice data, one preferred embodiment of the current invention confirms the user to enter an additional information that has been registered along with his or her voice data. The additional information is input via the input device 2 such a keyboard or a touch screen, and the additional information is used to look up the registered information in the secondary information storage unit 12. The registered information details a specific way to confirm the user in case of the failed voice recognition. One way to confirm is to call the user on the telephone at the registered telephone number in the secondary information storage unit 12. The notice unit 13 thus notices the user as specified by the secondary information. The user responds to the notice unit 13. If a computer terminal is used as a local processing unit, the additional information is entered via a key board and transmitted to the notice unit 13. Under the failed recognition, the alternate determination unit 14 affirmatively confirms the user as a bona fide user only when the specified requirements are fully complied.

Referring to FIG. 26, one preferred embodiment of the secondary information storage unit 12 is illustrated according to the current invention. As a user identification, a birth date or a secret personal identification number is used. The additional information includes a method of confirmation such as telephone, an associated secondary information and so on.

Figure 27:
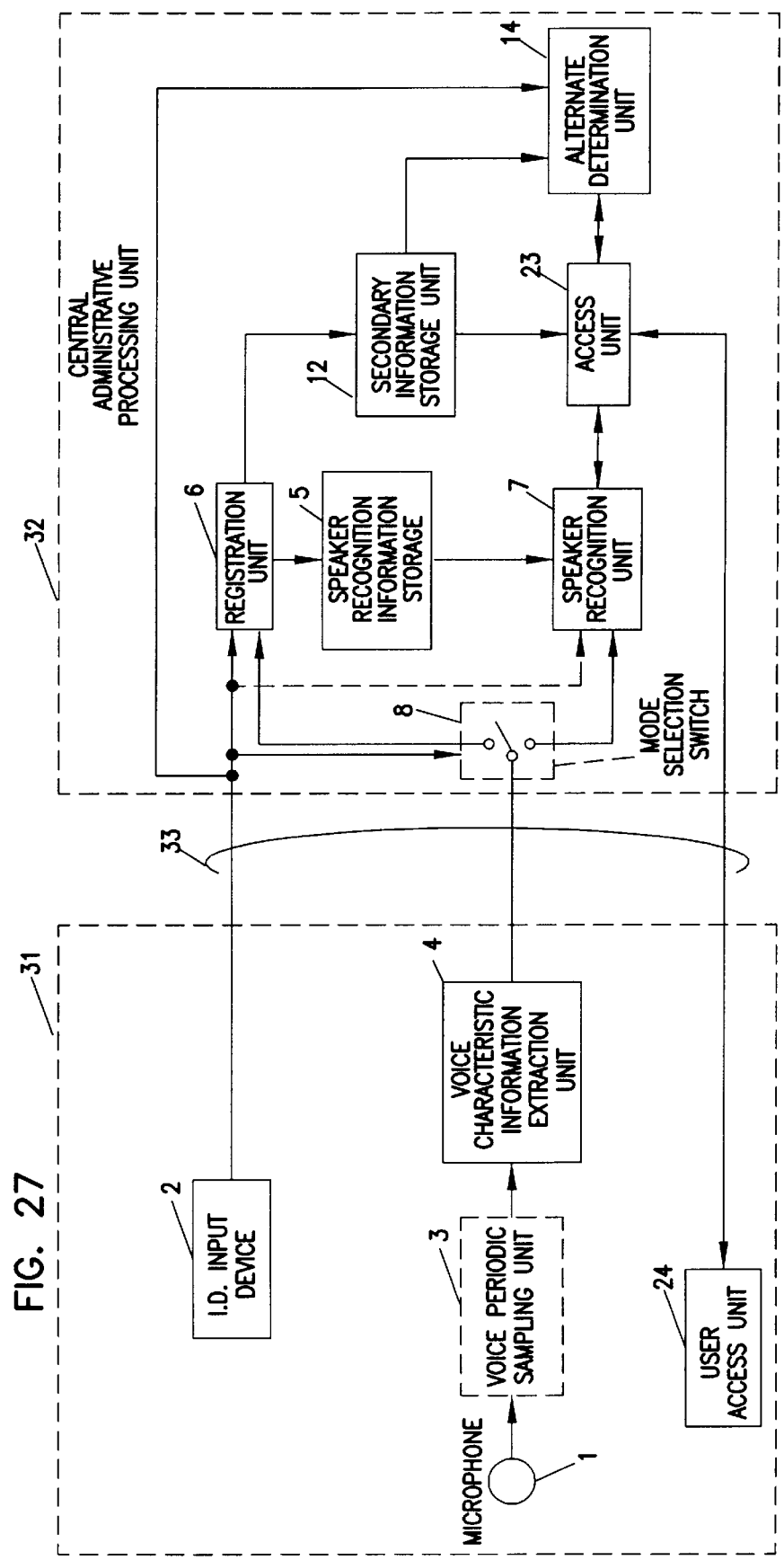
FIG. 27 diagrammatically illustrates one preferred embodiment of the speaker recognition system with a security unit according to the current invention.

Referring to FIG. 27, the above described preferred embodiment is more fully illustrated in the computer network environment. A local processing unit 31 is connected to a administrative central processing unit 32 through a communication line 33. When the bona fide user's voice is not recognized, an access unit 23 retrieves the corresponding specified information from the secondary information storage unit 12. The access unit 23 then contacts the bona fide user via a user access unit 24 according to the specified information. For example, if the specified information specifies a telephone access and includes a telephone number, the access unit 23 calls the number for confirmation. For example, the confirmation is accomplished by entering a secret personal id number via a telephone dialing buttons. A alternate determination unit 14 compares the personal id to the registered id number for confirmation and generates an authorization signal for further processing. The telephone confirmation is accomplished by automatic dialing or a human system administrator.

Figure 28:
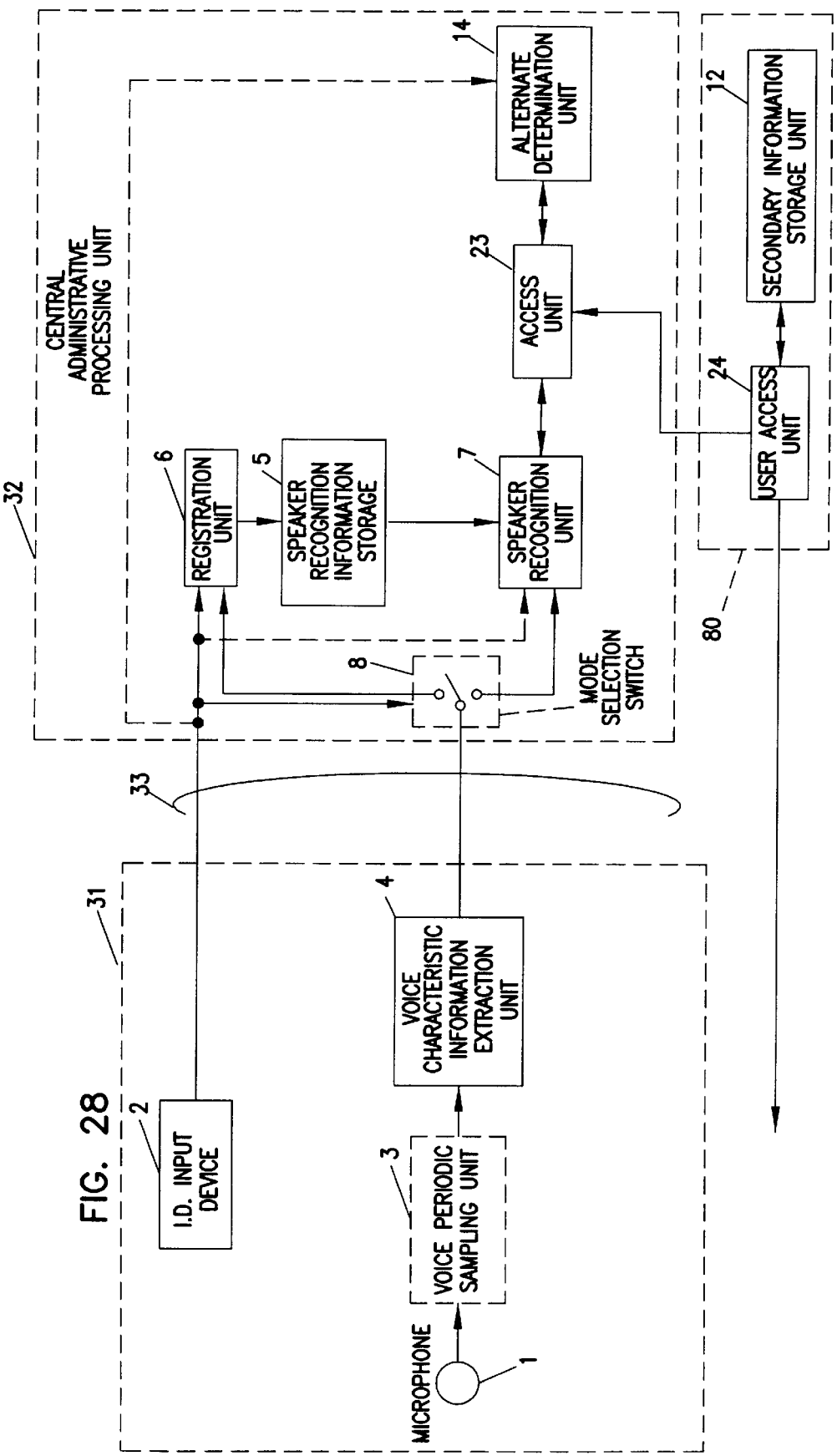
FIG. 28 diagrammatically illustrates a first alternative embodiment of the speaker recognition system with a security unit according to the current invention.
Figure 29:
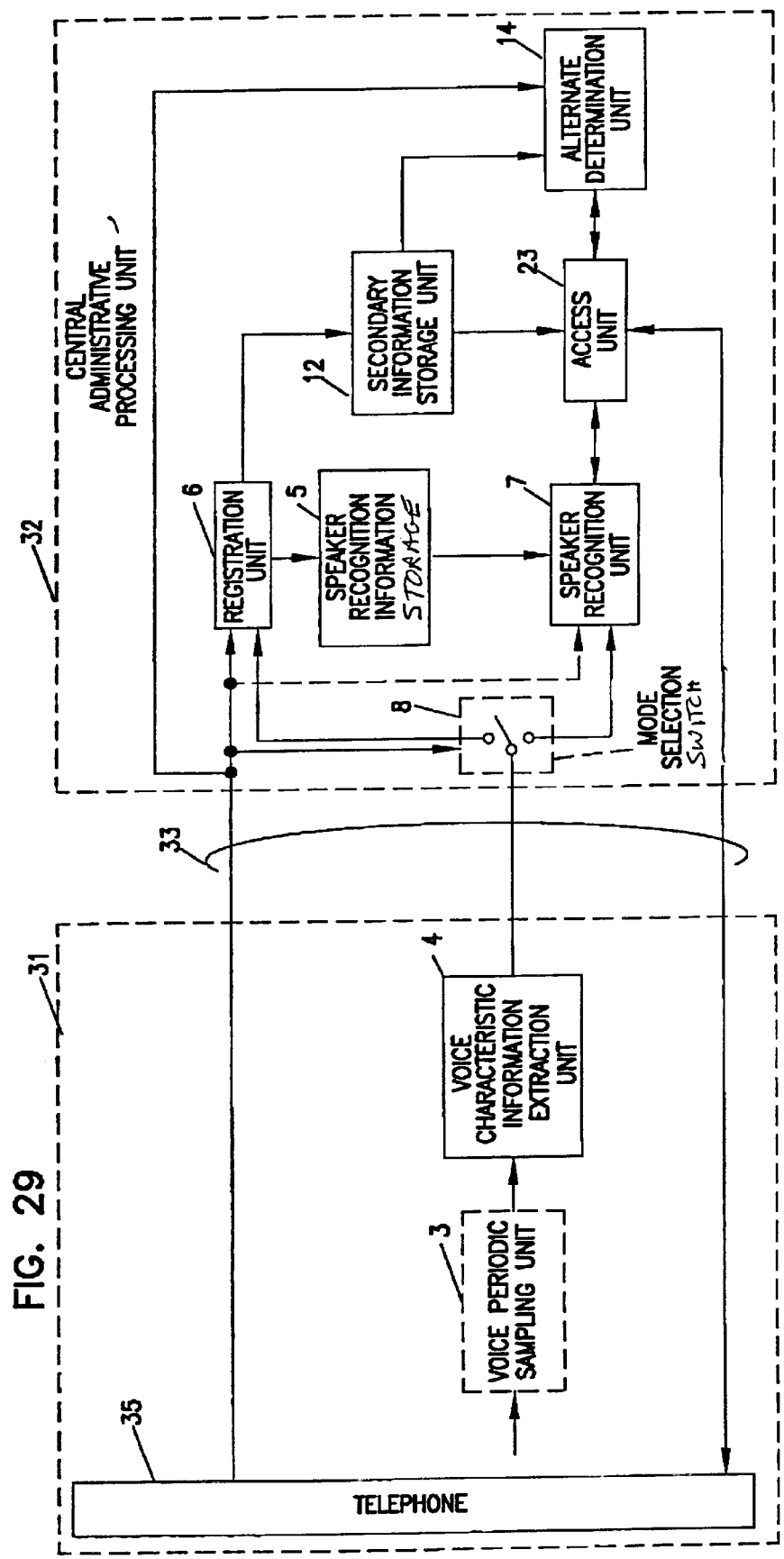
FIG. 29 diagrammatically illustrates a second alternative embodiment of the speaker recognition system with a security unit according to the current invention.
Figure 30:
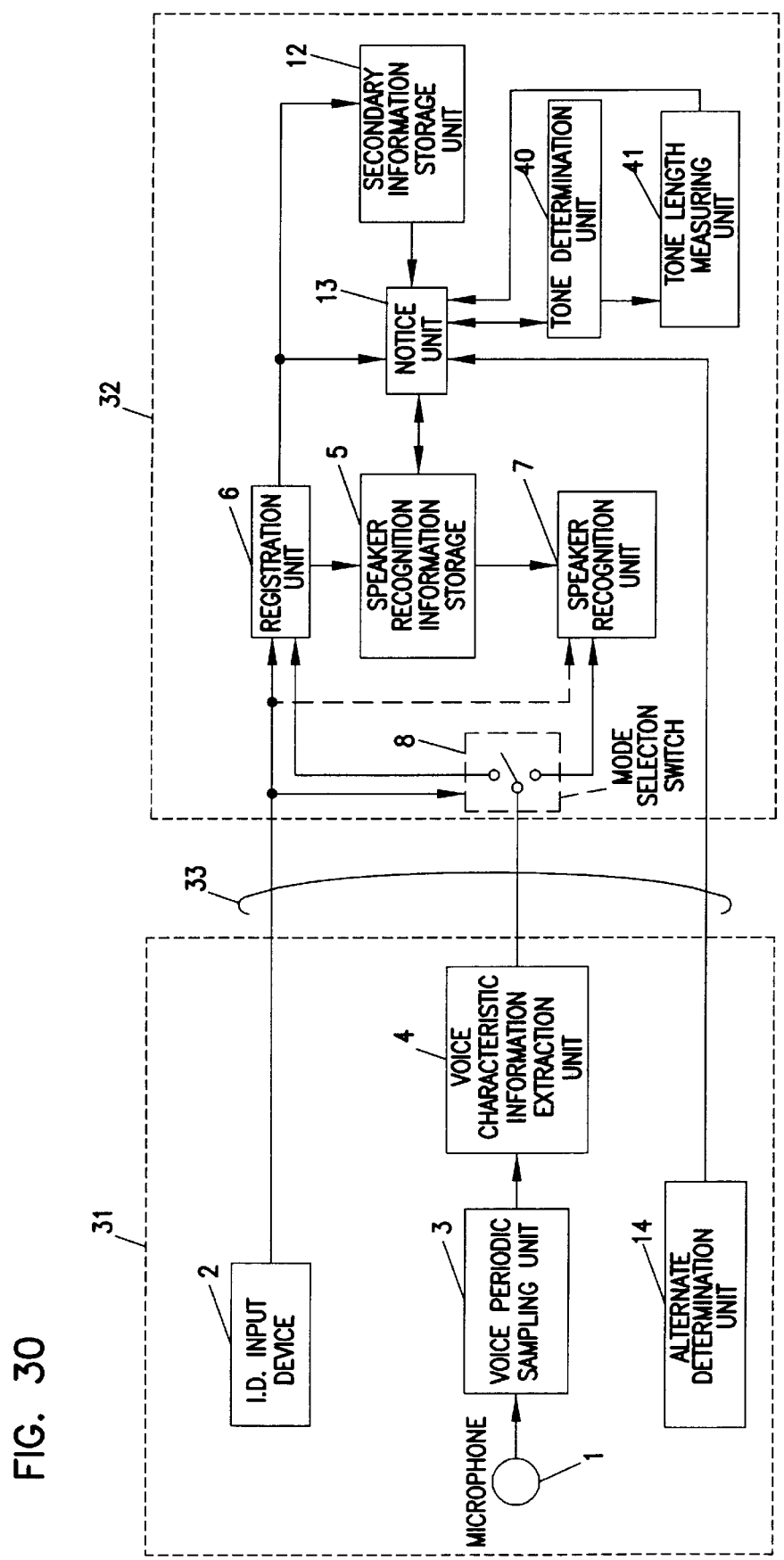
FIG. 30 diagrammatically illustrates a third alternative embodiment of the speaker recognition system with a security unit according to the current invention.

Referring to FIGS. 28, 29 and 30, three alternative embodiments to the above described preferred embodiment of FIG. 27 are illustrated. A first alternative embodiment as shown in FIG. 28 is differed in that a user access unit 24 and a secondary information storage unit 12 are included in a separate operational unit 80. The operational unit 80 is located in a operational center at a separate location. A second alternative embodiment as shown in FIG. 29 is differed in that a local processing unit 31 includes a telephone 35 which is either conventional or cellular. The telephone 35 is connected to a central administrative processing unit 32, and in particular to a registration unit 6 and an access unit 23. A touch tone key pad of the telephone 35 is used to specify numerical information for the purpose of the alternate user identification. A third alternative embodiment as shown in FIG. 30 assumes that an user access unit 14 is a telephone, and the bona fide user is already using the same telephone line 33 for the purpose of communication to an administrative central processor 32. When an access unit 13 calls the user access unit 14 for the purpose of confirmation, since the line is already in use, a tone determination unit 40 and a tone length measuring unit 41 collectively determine whether or not the line is busy based upon the pause between the tone sounds. The access unit 13 uses the above tone signal information to determine whether the bona fide user is on the communication line.

Additional security features for recording inappropriate attempts for gaining access by an imposter are not shown in any figures. However, when the access unit or the speaker recognition unit determines that the requested access is not accepted on the basis of the voice recognition or alternative recognition process, the voice and or video data of the imposter is recorded for the future use.

The above security features as described with respect to FIGS. 24 through 30 are generally also applicable to the updating process for updating a standard voice pattern. In other words, in order to deny an improper updating process of the registered voice characteristic information, the above described confirmation processes are utilized to confirm that a requesting user is a bona fide original speaker.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of speaker recognition, comprising the steps of:
   a) storing predetermined first final voice characteristic information at a first site;
   b) inputting voice data at a second site;
   c) processing said voice data at said second site to generate intermediate voice characteristic information;
   d) transmitting said intermediate voice characteristic information from said second site to said first site;
   e) further processing at said first site said intermediate voice characteristic information transmitted from said second site for generating second final voice characteristic information; and
   f) determining at said first site whether said second final voice characteristic information is substantially matching said first final voice characteristic information and generating a determination signal indicative of the determination.

2. The method of speaker recognition according to claim 1 wherein said first site is a central location while said second site is a predetermined number of terminal locations.

3. The method of speaker recognition according to claim 1 further comprising an additional step of:
   g) transmitting said determination signal from said first site to said second site.

4. The method of speaker recognition according to claim 1 wherein said step c) further comprising the following steps of:
   h) sending a selection signal from said first site to said second site;
   h') identifying a desirable portion and a remaining portion of said voice data in response to said selection signal, said desirable portion substantially reflecting characteristics of said voice data;
   i) generating said intermediate voice characteristic information based upon said desirable portion; and
   j) retaining said remaining portion of said voice data.

5. The method of speaker recognition according to claim 4 wherein said steps i) and j) are repeated after said desirable portion is redefined from said remaining portion.

6. The method of speaker recognition according to claim 1 wherein said intermediate voice characteristic information is first encoded and then transmitted in said step d) and later decoded in said step e).

7. The method of speaker recognition according to claim 6 further comprising additional steps of:

k) selecting an encryption scheme from a plurality of predetermined encryption schemes;
l) transmitting encryption information on said selected encryption scheme from said first site to said second site;
m) encoding said intermediate voice characteristic information according to said encryption information; and
n) transmitting said encoded intermediate voice characteristic information from said second site to said first site.

8. The method of speaker recognition according to claim 7 wherein said step e) further comprises an additional step o) of decoding at said first site said encoded intermediate voice characteristic information according to said encryption information.

9. The method of speaker recognition according to claim 6 wherein said intermediate voice characteristic information is encoded according to a predetermined encoding and decoding scheme.

10. The method of speaker recognition according to claim 9 wherein one example of said predetermined encoding and decoding scheme includes the following steps of:
    p) dividing said intermediate voice characteristic information into a predetermined number of sequential segments at said second site;
    q) transmitting said segments in a predetermined non-sequential order from said second site to said first site; and
    r) sequencing said transmitted segments of said intermediate voice characteristic information back to said sequential segments at said first site.

11. The method of speaker recognition according to claim 1 wherein said intermediate voice characteristic information includes a voice data portion containing data indicative of said voice data and a parameter portion containing information on said voice data portion.

12. The method of speaker recognition according to claim 1 wherein in case said determination signal indicates a failure to match, said step f) further comprising the additional steps of:
    s) inputting alternative identification information at said second site;
    t) transmitting said alternative identification to said first site; and
    u) performing a predetermined alternative verification procedure based upon said alternative identification information.

13. The method of speaker recognition according to claim 1 wherein said step a) further comprises the following steps prior to storing said first final voice characteristic information:
    v) inputting test voice data;
    w) generating test intermediate voice characteristic information based upon said test voice data; and
    x) further processing said test voice data so as to generate said first final voice characteristic information.

14. The method of speaker recognition according to claim 1 wherein said step a) further comprises an additional step y) of updating said first voice characteristic information upon confirming that a requester to update said first voice characteristic information has authorization.

15. The method of speaker recognition according to claim 14 wherein said authorization is confirmed by a predetermined password.

16. The method of speaker recognition according to claim 15 wherein in case an improper attempt to update said first final voice characteristic information is detected, said improper attempt being recorded.

17. The method of speaker recognition according to claim 1 wherein said step b) is performed while predetermined noise is played in the background, said step e) removing said predetermined noise.

18. The method of speaker recognition according to claim 1 further comprising the steps of:
  I) selecting one noise pattern from a plurality of redetermined number of noise patterns;
  II) transmitting a noise signal specifying said selected one noise pattern from said first site to said second site prior to said step b);
  III) inputting said noise pattern and said voice data during said step b) at said second site; and
  VI) removing said noise pattern at said first site during said step e).

19. A method of speaker recognition, comprising the steps of:
  a) storing a plurality of pairs of first final voice characteristic information and corresponding identification information at a first site;
  b) inputting voice data and one of said identification information at a second site;
  c) transmitting said identification information to said first site;
  d) transmitting to said second site one of said first final voice characteristic information which corresponds to said identification information as well as a determination factor;
  e) processing said voice data at said second site to generate second final voice characteristic information based upon said determination factor; and
  f) determining at said second site whether said second final voice characteristic information is substantially matching said first final voice characteristic information based upon said determination factor and generating a determination signal indicative of the determination.

20. The method of speaker recognition according to claim 19 wherein said first site is a central location while said second site is a predetermined number of terminal locations.

21. The method of speaker recognition according to claim 20 wherein said determination factor is a threshold value which affects said determination step f), said threshold value being variable.

22. A speaker recognition system, comprising:
  a registration unit for processing voice data to generate standard voice characteristic information according said voice data and storing said standard voice characteristic information therein;
  a first processing unit for inputting test voice data and for processing said test voice data to generate intermediate test voice characteristic information; and
  a second processing unit communicatively connected to said first processing unit for receiving said intermediate test voice characteristic information and for further processing said intermediate test voice characteristic information to generate test voice characteristic information, said processing unit connected to said registration processing unit for determining if said test voice characteristic information substantially matches said standard voice characteristic information.

23. The speaker recognition system according to claim 22 wherein said first processing unit and said second processing unit are a part of computer network, said first processing unit being a terminal while said second processing unit being a central unit.

24. The speaker recognition system according to claim 22 where said processing unit generates a determination signal indicative of the determination and transmits said determination signal to said first processing unit.

25. The speaker recognition system according to claim 22 wherein said first processing unit further comprises:
  a diving unit for dividing said voice data into a desirable portion and a remaining portion, said desirable portion substantially reflecting characteristics of said voice data;
  an extraction unit for extracting said intermediate voice characteristic information from said desirable portion; and
  a storage unit for retaining said remaining portion of said voice data.

26. The speaker recognition system according to claim 22 wherein said first processing unit further includes an encoding unit for encoding said intermediate voice characteristic information and said second processing unit further includes a decoding unit for decoding said encoded intermediate voice characteristic information.

27. The speaker recognition according to claim 26 wherein said second processing unit selects an encryption scheme from a plurality of predetermined encryption schemes, said second processing unit transmitting encryption information on said selected encryption scheme to said first processing unit, said encoding unit encoding said intermediate voice characteristic information according to said encryption information, said first processing unit transmitting said encoded intermediate voice characteristic information to said second processing unit, said decoding unit decoding said encoded intermediate voice characteristic information according to said encryption information.

28. The speaker recognition system according to claim 26 wherein said intermediate voice characteristic information is encoded according to a predetermined encoding and decoding scheme.

29. The speaker recognition system according to claim 22 wherein said intermediate voice characteristic information includes a voice data portion containing data indicative of said voice data and a parameter portion containing information on said voice data portion.

30. The speaker recognition system according to claim 24 further comprising:
  an alternative identification input device for inputting alternative identification information in case said determination signal indicates a failure to match, said second processing unit performing a predetermined alternative verification procedure based upon said alternative identification information.

31. The speaker recognition system according to claim 22 wherein said registration unit further comprises:
  a password input unit for inputting a current password;
  a password comparison unit for comparing said current password to a stored password and generating a comparison signal; and
  an updating unit for updating said first voice characteristic information based upon said comparison signal.

32. The speaker recognition system according to claim 31 wherein said registration unit records an improper attempt to update said first final voice characteristic information based upon said comparison signal.

33. The speaker recognition system according to claim 26 wherein said encoding unit generates predetermined noise while inputting test voice data to said first processing unit, said decoding unit removing said predetermined noise.

34. The speaker recognition system according to claim 26 wherein said second processing unit selects one noise pattern from a plurality of predetermined number of noise patterns, said second processing unit transmitting a noise signal specifying said selected one noise pattern to said encoder, said encoder adding said noise pattern to said voice data, said decoder removing said noise pattern.

35. A speaker recognition system, comprising:
- a first processing unit for processing voice data to generate standard voice characteristic information according said voice data and storing said standard voice characteristic information with an associated id information and a determination factor;
- a second processing unit operationally connected to said first processing unit for inputting said associated id information and test voice data, said second processing unit transmitting to said first processing unit said associated id information, said first processing unit sending said standard voice characteristic information and the determination factor to said second processing unit, said second processing unit generating a test voice characteristic information based upon said test voice data and the determination factor, said second processing unit determining whether or not said standard voice characteristic information substantially matches said test voice characteristic information.

36. The speaker recognition system according to claim 35 wherein said first processing unit is a central processor while said second processing unit includes a predetermined number of terminals.

37. The speaker recognition system according to claim 35 wherein said second processing unit determines if said standard voice characteristic information substantially matches said test voice characteristic information based upon a threshold value.

38. The speaker recognition system according to claim 37 wherein said first processing unit sends a threshold value to said second processing unit.

* * * * *